United States Patent
Vogel et al.

(10) Patent No.: US 12,169,405 B2
(45) Date of Patent: Dec. 17, 2024

(54) METHOD FOR NAVIGATION OF A ROBOT

(71) Applicant: Robart GmbH, Linz (AT)

(72) Inventors: Reinhard Vogel, Linz (AT); Harold Artes, Linz (AT); Dominik Seethaler, Linz (AT)

(73) Assignee: RoTrade Asset Management GmbH, Leonding (AT)

( * ) Notice: Subject to any disclaimer, the term of this patent is extended or adjusted under 35 U.S.C. 154(b) by 712 days.

(21) Appl. No.: 16/609,100

(22) PCT Filed: Apr. 27, 2018

(86) PCT No.: PCT/EP2018/060871
§ 371 (c)(1),
(2) Date: Jun. 29, 2020

(87) PCT Pub. No.: WO2018/197665
PCT Pub. Date: Nov. 1, 2018

(65) Prior Publication Data
US 2020/0319640 A1  Oct. 8, 2020

(30) Foreign Application Priority Data
Apr. 28, 2017  (DE) .................. 10 2017 109 219.6

(51) Int. Cl.
*G05D 1/00* (2006.01)
*A47L 9/00* (2006.01)
(Continued)

(52) U.S. Cl.
CPC ............ *G05D 1/0088* (2013.01); *A47L 9/009* (2013.01); *A47L 9/2805* (2013.01); *A47L 9/2842* (2013.01);
(Continued)

(58) Field of Classification Search
CPC .. G05D 1/0088; G05D 1/0212; G05D 1/0274; G05D 1/0291; G05D 2201/0203;
(Continued)

(56) References Cited

U.S. PATENT DOCUMENTS

| 4,674,048 A | 6/1987 | Okumura |
| 4,740,676 A | 4/1988 | Satoh et al. |

(Continued)

FOREIGN PATENT DOCUMENTS

| AU | 2015322263 | 4/2017 |
| CA | 2322419 | 9/1999 |

(Continued)

OTHER PUBLICATIONS

Office Action dated Apr. 19, 2022, in Japanese patent application No. 2019-558418, with translation.
(Continued)

*Primary Examiner* — Bhavesh V Amin
(74) *Attorney, Agent, or Firm* — Akerman LLP; Peter A. Chiabotti

(57) ABSTRACT

A method for controlling at least one autonomous mobile robot, wherein the at least one robot is designed to navigate within a functional area on the basis of a map of said functional area, and to perform at least one task autonomously in the functional area. The method involves: receiving a job request which contains instructions for carrying out at least one task in the functional area, automatically dividing the job request into at least two sub-tasks, and automatically determining a sequence in which said sub-tasks are to be processed by the at least one robot, the job request being fully completed once all sub-tasks have been processed.

30 Claims, 6 Drawing Sheets

(51) Int. Cl.
  *A47L 9/28* (2006.01)
  *G05D 1/02* (2020.01)
  *G06Q 10/0631* (2023.01)
  *G06Q 50/06* (2012.01)

(52) U.S. Cl.
  CPC ........... *A47L 9/2852* (2013.01); *A47L 9/2873* (2013.01); *G05D 1/0212* (2013.01); *G05D 1/0274* (2013.01); *G05D 1/0291* (2013.01); *G06Q 10/06312* (2013.01); *G06Q 10/06315* (2013.01); *G06Q 10/06316* (2013.01); *A47L 2201/022* (2013.01); *A47L 2201/04* (2013.01); *G05D 2201/0203* (2013.01); *G05D 2201/0215* (2013.01); *G06Q 50/06* (2013.01)

(58) Field of Classification Search
  CPC ............. G05D 2201/0215; A47L 9/009; A47L 9/2805; A47L 9/2842; A47L 9/2852; A47L 9/2873; A47L 2201/022; A47L 2201/04; G06Q 10/06312; G06Q 10/06315; G06Q 10/06316; G06Q 50/06; G06Q 10/04
  See application file for complete search history.

(56) References Cited

U.S. PATENT DOCUMENTS

| | | | |
|---|---|---|---|
| 4,777,416 A | 10/1988 | George, II et al. | |
| 5,109,566 A | 5/1992 | Kobayashi et al. | |
| 5,220,263 A * | 6/1993 | Onishi | G05D 1/0297 318/587 |
| 5,260,710 A | 11/1993 | Omamyuda et al. | |
| 5,284,522 A | 2/1994 | Kobayashi et al. | |
| 5,377,106 A | 12/1994 | Drunk et al. | |
| 5,402,051 A | 3/1995 | Fujiwara et al. | |
| 5,696,675 A | 12/1997 | Nakamura et al. | |
| 5,787,545 A | 8/1998 | Colens | |
| 5,995,884 A | 11/1999 | Allen et al. | |
| 6,366,219 B1 | 4/2002 | Hoummady | |
| 6,389,329 B1 * | 5/2002 | Colens | A47L 9/2805 318/587 |
| 6,532,404 B2 | 3/2003 | Colens | |
| 6,594,844 B2 | 7/2003 | Jones | |
| 6,605,156 B1 | 8/2003 | Clark et al. | |
| 6,615,108 B1 | 9/2003 | Peless et al. | |
| 6,667,592 B2 | 12/2003 | Jacobs et al. | |
| 6,690,134 B1 | 2/2004 | Jones et al. | |
| 6,764,373 B1 | 7/2004 | Osawa et al. | |
| 6,781,338 B2 | 8/2004 | Jones et al. | |
| 6,809,490 B2 | 10/2004 | Jones et al. | |
| 6,836,701 B2 * | 12/2004 | McKee | G05D 1/0297 701/25 |
| 6,965,209 B2 | 11/2005 | Jones et al. | |
| 6,972,834 B1 | 12/2005 | Oka et al. | |
| 7,054,716 B2 * | 5/2006 | McKee | G05D 1/0251 701/1 |
| 7,065,567 B1 * | 6/2006 | Squires | G06F 3/1208 358/1.14 |
| 7,155,308 B2 | 12/2006 | Jones | |
| 7,173,391 B2 | 2/2007 | Jones et al. | |
| 7,196,487 B2 | 3/2007 | Jones et al. | |
| 7,302,345 B2 | 11/2007 | Kwon et al. | |
| 7,388,343 B2 | 6/2008 | Jones et al. | |
| 7,389,156 B2 | 6/2008 | Ziegler et al. | |
| 7,448,113 B2 | 11/2008 | Jones et al. | |
| 7,483,151 B2 | 1/2009 | Zganec et al. | |
| 7,507,948 B2 | 3/2009 | Park et al. | |
| 7,539,557 B2 | 5/2009 | Yamauchi | |
| 7,571,511 B2 | 8/2009 | Jones et al. | |
| 7,636,982 B2 | 12/2009 | Jones et al. | |
| 7,656,541 B2 | 2/2010 | Waslowski et al. | |
| 7,706,917 B1 * | 4/2010 | Chiappetta | H02J 50/10 700/258 |
| 7,761,954 B2 | 7/2010 | Ziegler et al. | |
| 7,765,028 B2 | 7/2010 | Orita | |
| 7,801,676 B2 | 9/2010 | Kurosawa et al. | |
| 7,856,290 B2 * | 12/2010 | Kumhyr | H02J 7/0013 191/1 R |
| 8,027,750 B2 | 9/2011 | Atsuo | |
| 8,390,251 B2 * | 3/2013 | Cohen | G01S 1/7038 320/109 |
| 8,438,695 B2 | 5/2013 | Gilbert et al. | |
| 8,594,019 B2 | 11/2013 | Misumi | |
| 8,739,355 B2 * | 6/2014 | Morse | A47L 11/4041 15/340.1 |
| 8,761,925 B2 * | 6/2014 | Yoon | G06V 40/23 700/250 |
| 8,774,970 B2 * | 7/2014 | Knopow | A47L 5/28 15/385 |
| 8,855,914 B1 | 10/2014 | Alexander et al. | |
| 8,892,251 B1 | 11/2014 | Dooley et al. | |
| 8,921,752 B2 | 12/2014 | Iizuka | |
| 8,982,217 B1 | 3/2015 | Hickman | |
| 9,002,511 B1 | 4/2015 | Hickerson et al. | |
| 9,008,835 B2 * | 4/2015 | Dubrovsky | G05D 1/0016 700/264 |
| 9,026,302 B2 | 5/2015 | Stout et al. | |
| 9,037,294 B2 | 5/2015 | Chung et al. | |
| 9,043,017 B2 | 5/2015 | Jung et al. | |
| 9,149,170 B2 | 10/2015 | Ozick et al. | |
| 9,220,386 B2 | 12/2015 | Gilbert, Jr. et al. | |
| 9,233,472 B2 * | 1/2016 | Angle | G05D 1/0044 |
| 9,380,922 B2 | 7/2016 | Duffley | |
| 9,486,924 B2 | 11/2016 | Dubrovsky et al. | |
| 9,717,387 B1 | 8/2017 | Szatmary et al. | |
| 9,802,322 B2 * | 10/2017 | Angle | B25J 13/006 |
| 10,228,697 B2 | 3/2019 | Yoshino | |
| 10,391,638 B2 * | 8/2019 | Angle | G05D 1/0022 |
| 11,131,996 B2 * | 9/2021 | Liu | G05D 1/0219 |
| 2002/0011813 A1 * | 1/2002 | Koselka | A47L 11/4047 318/445 |
| 2002/0016649 A1 | 2/2002 | Jones | |
| 2002/0095239 A1 * | 7/2002 | Wallach | G05D 1/0295 700/245 |
| 2002/0103575 A1 | 8/2002 | Sugawara | |
| 2002/0120364 A1 | 8/2002 | Colens | |
| 2002/0124343 A1 * | 9/2002 | Reed | G05D 1/0225 15/319 |
| 2002/0156556 A1 * | 10/2002 | Ruffner | G01S 5/12 318/587 |
| 2003/0025472 A1 | 2/2003 | Jones et al. | |
| 2003/0030398 A1 | 2/2003 | Jacobs et al. | |
| 2003/0120389 A1 | 6/2003 | Abramson | |
| 2003/0142925 A1 | 7/2003 | Melchior et al. | |
| 2003/0212472 A1 * | 11/2003 | McKee | G05D 1/0274 318/568.12 |
| 2004/0020000 A1 | 2/2004 | Jones | |
| 2004/0049877 A1 | 3/2004 | Jones et al. | |
| 2004/0073337 A1 * | 4/2004 | McKee | G05D 1/0274 700/245 |
| 2004/0187457 A1 | 9/2004 | Colens | |
| 2004/0207355 A1 | 10/2004 | Jones et al. | |
| 2005/0000543 A1 | 1/2005 | Taylor et al. | |
| 2005/0010331 A1 | 1/2005 | Taylor et al. | |
| 2005/0022273 A1 * | 1/2005 | Maeki | G05D 1/0274 901/1 |
| 2005/0041839 A1 | 2/2005 | Saitou et al. | |
| 2005/0067994 A1 | 3/2005 | Jones et al. | |
| 2005/0156562 A1 * | 7/2005 | Cohen | B25J 9/1664 320/107 |
| 2005/0171636 A1 | 8/2005 | Tani | |
| 2005/0171644 A1 | 8/2005 | Tani | |
| 2005/0204717 A1 | 9/2005 | Colens | |
| 2005/0212680 A1 | 9/2005 | Uehigashi | |
| 2005/0229338 A1 * | 10/2005 | Kashiwagi | A47L 9/2842 15/1 |
| 2005/0256610 A1 | 11/2005 | Orita | |
| 2006/0020369 A1 | 1/2006 | Taylor | |
| 2006/0061657 A1 * | 3/2006 | Rew | G05D 1/0246 348/151 |

(56) References Cited

U.S. PATENT DOCUMENTS

| | | | |
|---|---|---|---|
| 2006/0087273 A1* | 4/2006 | Ko | A47L 9/2805 318/587 |
| 2006/0095158 A1 | 5/2006 | Lee et al. | |
| 2006/0102532 A1* | 5/2006 | Cadotte | E04H 4/1654 210/94 |
| 2006/0200282 A1* | 9/2006 | Lee | G05D 1/0274 701/23 |
| 2006/0237037 A1* | 10/2006 | Kim | G05D 1/0219 134/21 |
| 2006/0237634 A1 | 10/2006 | Kim | |
| 2006/0288519 A1* | 12/2006 | Jaworski | A47L 11/4036 15/340.1 |
| 2006/0293788 A1* | 12/2006 | Pogodin | G05D 1/0011 701/23 |
| 2007/0027579 A1 | 2/2007 | Suzuki et al. | |
| 2007/0061041 A1 | 3/2007 | Zweig | |
| 2007/0234492 A1 | 10/2007 | Svendsen et al. | |
| 2007/0250212 A1* | 10/2007 | Halloran | A47L 9/009 901/1 |
| 2007/0266508 A1 | 11/2007 | Jones et al. | |
| 2007/0267998 A1* | 11/2007 | Cohen | A47L 9/2889 320/109 |
| 2007/0282484 A1 | 12/2007 | Chung et al. | |
| 2008/0027591 A1* | 1/2008 | Lenser | G05D 1/0038 701/28 |
| 2008/0039974 A1* | 2/2008 | Sandin | G05D 1/0259 901/46 |
| 2008/0046125 A1* | 2/2008 | Myeong | G05D 1/0219 700/253 |
| 2008/0109114 A1 | 5/2008 | Orita et al. | |
| 2008/0133054 A1* | 6/2008 | Kim | A47L 9/2857 901/1 |
| 2008/0140255 A1 | 6/2008 | Ziegler et al. | |
| 2008/0155768 A1 | 7/2008 | Ziegler et al. | |
| 2008/0192256 A1 | 8/2008 | Wolf et al. | |
| 2008/0273791 A1* | 11/2008 | Lee | G05D 1/0274 382/173 |
| 2008/0307590 A1 | 12/2008 | Jones et al. | |
| 2009/0048727 A1 | 2/2009 | Hong et al. | |
| 2009/0051921 A1 | 2/2009 | Masahiko | |
| 2009/0177320 A1 | 7/2009 | Lee et al. | |
| 2009/0182464 A1 | 7/2009 | Myeong et al. | |
| 2009/0281661 A1 | 11/2009 | Dooley et al. | |
| 2010/0030380 A1 | 2/2010 | Shah et al. | |
| 2010/0049365 A1 | 2/2010 | Jones et al. | |
| 2010/0082193 A1 | 4/2010 | Chiappetta | |
| 2010/0257690 A1 | 10/2010 | Jones et al. | |
| 2010/0257691 A1 | 10/2010 | Jones et al. | |
| 2010/0263158 A1 | 10/2010 | Jones et al. | |
| 2010/0324731 A1 | 12/2010 | Letsky | |
| 2010/0324736 A1 | 12/2010 | Yoo et al. | |
| 2011/0054689 A1 | 3/2011 | Nielsen et al. | |
| 2011/0098853 A1* | 4/2011 | Park | G05D 1/0219 700/250 |
| 2011/0137461 A1 | 6/2011 | Kong et al. | |
| 2011/0194755 A1 | 8/2011 | Jeong et al. | |
| 2011/0211731 A1 | 9/2011 | Lee et al. | |
| 2011/0224824 A1 | 9/2011 | Lee et al. | |
| 2011/0236026 A1 | 9/2011 | Yoo et al. | |
| 2011/0238214 A1 | 9/2011 | Yoo et al. | |
| 2011/0264305 A1 | 10/2011 | Choe et al. | |
| 2011/0278082 A1 | 11/2011 | Chung et al. | |
| 2011/0295420 A1 | 12/2011 | Wagner | |
| 2012/0008128 A1 | 1/2012 | Bamji | |
| 2012/0013907 A1 | 1/2012 | Jung et al. | |
| 2012/0022785 A1 | 1/2012 | DiBernardo et al. | |
| 2012/0060320 A1 | 3/2012 | Lee et al. | |
| 2012/0069457 A1 | 3/2012 | Wolf et al. | |
| 2012/0158915 A1* | 6/2012 | Ham | A47L 9/2868 709/219 |
| 2012/0169497 A1 | 7/2012 | Schnittman et al. | |
| 2012/0173070 A1 | 7/2012 | Schnittman | |
| 2012/0215380 A1 | 8/2012 | Fouillade et al. | |
| 2012/0223216 A1 | 9/2012 | Flaherty et al. | |
| 2012/0265370 A1 | 10/2012 | Kim et al. | |
| 2012/0271502 A1 | 10/2012 | Lee | |
| 2012/0283905 A1 | 11/2012 | Nakano et al. | |
| 2013/0001398 A1 | 1/2013 | Wada et al. | |
| 2013/0024025 A1 | 1/2013 | Hsu | |
| 2013/0166134 A1 | 6/2013 | Shitamoto | |
| 2013/0206177 A1 | 8/2013 | Burlutskiy | |
| 2013/0217421 A1 | 8/2013 | Kim | |
| 2013/0221908 A1 | 8/2013 | Tang | |
| 2013/0261867 A1 | 10/2013 | Burnett et al. | |
| 2013/0265562 A1 | 10/2013 | Tang et al. | |
| 2013/0317944 A1 | 11/2013 | Huang et al. | |
| 2014/0005933 A1 | 1/2014 | Fong et al. | |
| 2014/0098218 A1 | 4/2014 | Wu et al. | |
| 2014/0100693 A1 | 4/2014 | Fong et al. | |
| 2014/0115797 A1 | 5/2014 | Duenne | |
| 2014/0124004 A1 | 5/2014 | Rosenstein et al. | |
| 2014/0128093 A1 | 5/2014 | Das et al. | |
| 2014/0156125 A1 | 6/2014 | Song et al. | |
| 2014/0207280 A1 | 7/2014 | Duffley et al. | |
| 2014/0207281 A1* | 7/2014 | Angle | H04L 12/282 700/257 |
| 2014/0207282 A1* | 7/2014 | Angle | B25J 13/006 901/1 |
| 2014/0218517 A1 | 8/2014 | Kim et al. | |
| 2014/0257563 A1 | 9/2014 | Park et al. | |
| 2014/0257564 A1 | 9/2014 | Sun et al. | |
| 2014/0257565 A1 | 9/2014 | Sun et al. | |
| 2014/0303775 A1 | 10/2014 | Oh et al. | |
| 2014/0316636 A1 | 10/2014 | Hong et al. | |
| 2014/0324270 A1 | 10/2014 | Chan et al. | |
| 2014/0343783 A1 | 11/2014 | Lee | |
| 2015/0000068 A1* | 1/2015 | Tsuboi | G05B 19/18 901/1 |
| 2015/0115138 A1 | 4/2015 | Heng et al. | |
| 2015/0115876 A1 | 4/2015 | Noh et al. | |
| 2015/0120056 A1 | 4/2015 | Noh et al. | |
| 2015/0151646 A1 | 6/2015 | Noiri | |
| 2015/0168954 A1 | 6/2015 | Hickerson et al. | |
| 2015/0173578 A1 | 6/2015 | Kim et al. | |
| 2015/0202772 A1 | 7/2015 | Kim | |
| 2015/0212520 A1 | 7/2015 | Artes et al. | |
| 2015/0223659 A1 | 8/2015 | Han et al. | |
| 2015/0245754 A1* | 9/2015 | Jang | A47L 11/4066 15/49.1 |
| 2015/0260829 A1 | 9/2015 | Wada | |
| 2015/0265125 A1 | 9/2015 | Lee et al. | |
| 2015/0314453 A1 | 11/2015 | Witelson et al. | |
| 2015/0367513 A1 | 12/2015 | Gettings et al. | |
| 2016/0008982 A1 | 1/2016 | Artes et al. | |
| 2016/0037983 A1 | 2/2016 | Hillen et al. | |
| 2016/0041029 A1 | 2/2016 | T'ng et al. | |
| 2016/0066759 A1 | 3/2016 | Langhammer et al. | |
| 2016/0088993 A1* | 3/2016 | Chuang | A47L 11/32 15/49.1 |
| 2016/0103451 A1 | 4/2016 | Vicenti | |
| 2016/0132056 A1 | 5/2016 | Yoshino | |
| 2016/0150933 A1 | 6/2016 | Duenne et al. | |
| 2016/0165795 A1 | 6/2016 | Balutis et al. | |
| 2016/0166126 A1 | 6/2016 | Morin et al. | |
| 2016/0209217 A1 | 7/2016 | Babu et al. | |
| 2016/0213218 A1 | 7/2016 | Ham et al. | |
| 2016/0229060 A1 | 8/2016 | Kim et al. | |
| 2016/0271795 A1 | 9/2016 | Vicenti | |
| 2016/0282862 A1 | 9/2016 | Duffley | |
| 2016/0282873 A1 | 9/2016 | Masaki et al. | |
| 2016/0297072 A1 | 10/2016 | Williams et al. | |
| 2016/0298970 A1 | 10/2016 | Lindhe et al. | |
| 2017/0001311 A1 | 1/2017 | Bushman et al. | |
| 2017/0083022 A1 | 3/2017 | Tang | |
| 2017/0147000 A1 | 5/2017 | Hoennige et al. | |
| 2017/0177001 A1 | 6/2017 | Cao et al. | |
| 2017/0197314 A1 | 7/2017 | Stout et al. | |
| 2017/0231452 A1 | 8/2017 | Saito et al. | |
| 2017/0364087 A1 | 12/2017 | Tang et al. | |
| 2018/0249874 A1* | 9/2018 | Kuhara | A47L 9/2805 |
| 2018/0252534 A1* | 9/2018 | Kuhara | A47L 9/2847 |

(56) References Cited

U.S. PATENT DOCUMENTS

| | | | |
|---|---|---|---|
| 2018/0344116 A1* | 12/2018 | Schriesheim | G05D 1/0016 |
| 2020/0319640 A1* | 10/2020 | Vogel | A47L 9/2842 |

FOREIGN PATENT DOCUMENTS

| | | |
|---|---|---|
| CN | 1381340 | 11/2002 |
| CN | 1399734 A | 2/2003 |
| CN | 1696612 | 11/2005 |
| CN | 101945325 | 1/2011 |
| CN | 101972129 | 2/2011 |
| CN | 102407522 | 4/2012 |
| CN | 102738862 | 10/2012 |
| CN | 203672362 | 6/2014 |
| CN | 104115082 A | 10/2014 |
| CN | 104460663 | 3/2015 |
| CN | 104634601 | 5/2015 |
| CN | 104737085 A | 6/2015 |
| CN | 104765362 | 7/2015 |
| CN | 105045098 | 11/2015 |
| CN | 105334847 | 2/2016 |
| CN | 105467398 | 4/2016 |
| CN | 105527619 | 4/2016 |
| CN | 105990876 | 10/2016 |
| DE | 4421805 | 8/1995 |
| DE | 10204223 | 8/2003 |
| DE | 10261787 | 1/2004 |
| DE | 60002209 | 3/2004 |
| DE | 69913150 | 8/2004 |
| DE | 102007016802 | 5/2008 |
| DE | 102008028931 | 6/2008 |
| DE | 102008014912 | 9/2009 |
| DE | 102009059217 | 2/2011 |
| DE | 102009041362 | 3/2011 |
| DE | 102009052629 | 5/2011 |
| DE | 102010000174 | 7/2011 |
| DE | 102010000317 | 8/2011 |
| DE | 102010000607 | 9/2011 |
| DE | 102010017211 | 12/2011 |
| DE | 102010017689 | 1/2012 |
| DE | 102010033768 | 2/2012 |
| DE | 102011050357 | 2/2012 |
| DE | 102012201870 | 8/2012 |
| DE | 102011006062 | 9/2012 |
| DE | 102011051729 | 1/2013 |
| DE | 102012211071 | 11/2013 |
| DE | 102012105608 | 1/2014 |
| DE | 102012109004 | 3/2014 |
| DE | 202014100346 | 3/2014 |
| DE | 102012112035 | 6/2014 |
| DE | 102012112036 | 6/2014 |
| DE | 102013100192 | 7/2014 |
| DE | 102014110265 | 7/2014 |
| DE | 102014113040 | 9/2014 |
| DE | 102013104399 | 10/2014 |
| DE | 102013104547 | 11/2014 |
| DE | 102015006014 | 5/2015 |
| DE | 102014012811 | 10/2015 |
| DE | 102015119501 | 11/2015 |
| DE | 102014110104 | 1/2016 |
| DE | 102016102644 | 2/2016 |
| EP | 142594 | 5/1985 |
| EP | 402764 | 12/1990 |
| EP | 0769923 | 5/1997 |
| EP | 1062524 | 12/2000 |
| EP | 1342984 | 9/2003 |
| EP | 1533629 | 5/2005 |
| EP | 1553536 | 7/2005 |
| EP | 1557730 | 7/2005 |
| EP | 1621948 | 2/2006 |
| EP | 1942313 | 7/2008 |
| EP | 1947477 | 7/2008 |
| EP | 1983396 | 10/2008 |
| EP | 2027806 | 2/2009 |
| EP | 2053417 | 4/2009 |
| EP | 2078996 | 7/2009 |
| EP | 2287697 | 2/2011 |
| EP | 2327957 | 6/2011 |
| EP | 1941411 | 9/2011 |
| EP | 2407847 | 1/2012 |
| EP | 2450762 | 5/2012 |
| EP | 2457486 | 5/2012 |
| EP | 2498158 | 9/2012 |
| EP | 2502539 | 9/2012 |
| EP | 2511782 | 10/2012 |
| EP | 2515196 | 10/2012 |
| EP | 2573639 | 3/2013 |
| EP | 2595024 | 5/2013 |
| EP | 2740013 | 6/2014 |
| EP | 2741159 | 6/2014 |
| EP | 2853976 | 4/2015 |
| EP | 2870852 | 5/2015 |
| EP | 3079030 | 11/2015 |
| EP | 3156873 | 4/2017 |
| EP | 3184013 | 6/2017 |
| GB | 2509989 | 7/2014 |
| GB | 2509990 | 7/2014 |
| GB | 2509991 | 7/2014 |
| GB | 2513912 | 11/2014 |
| JP | H04338433 | 11/1992 |
| JP | 2001125641 | 5/2001 |
| JP | 2002085305 | 3/2002 |
| JP | 2003330543 | 11/2003 |
| JP | 2004133882 | 4/2004 |
| JP | 2005205028 | 8/2005 |
| JP | 2005-324278 A | 11/2005 |
| JP | 2009238055 | 10/2009 |
| JP | 2010227894 | 10/2010 |
| JP | 2013077088 | 4/2013 |
| JP | 2013146302 | 8/2013 |
| JP | 2014176260 | 9/2014 |
| JP | 201541203 | 3/2015 |
| JP | 2016-513981 | 5/2016 |
| JP | 2016-515311 A1 | 5/2016 |
| KR | 100735565 | 5/2006 |
| KR | 100815545 | 3/2008 |
| KR | 20110092158 | 8/2011 |
| KR | 20140073854 | 6/2014 |
| KR | 20140145648 | 12/2014 |
| KR | 20150009413 | 1/2015 |
| KR | 20150050161 | 5/2015 |
| KR | 20150086075 | 7/2015 |
| KR | 20150124011 | 11/2015 |
| KR | 20150124013 | 11/2015 |
| KR | 20150124014 | 11/2015 |
| KR | 20150127937 | 11/2015 |
| KR | 101640706 | 7/2016 |
| KR | 20160097051 | 8/2016 |
| WO | 9523346 | 8/1995 |
| WO | 9928800 | 6/1999 |
| WO | 200004430 | 1/2000 |
| WO | 2005074362 | 8/2005 |
| WO | WO2006038576 A1 | 4/2006 |
| WO | 2007028667 | 3/2007 |
| WO | 2012099694 | 7/2012 |
| WO | 2012157951 | 11/2012 |
| WO | 2013116887 | 8/2013 |
| WO | 2014017256 | 1/2014 |
| WO | 2014043732 | 3/2014 |
| WO | 2014055966 | 4/2014 |
| WO | 2014113091 | 7/2014 |
| WO | 2014138472 | 9/2014 |
| WO | 2015018437 | 2/2015 |
| WO | 2015025599 | 2/2015 |
| WO | 2015072897 | 5/2015 |
| WO | 2015082017 | 6/2015 |
| WO | 2015090398 | 6/2015 |
| WO | 2015158240 | 10/2015 |
| WO | 2015181995 | 12/2015 |
| WO | 2016019996 | 2/2016 |
| WO | 2016027957 | 2/2016 |
| WO | 2016028021 | 2/2016 |
| WO | 2016031702 | 3/2016 |
| WO | 2016048077 | 3/2016 |

(56) References Cited

FOREIGN PATENT DOCUMENTS

| WO | 2016050215 | 4/2016 |
|---|---|---|
| WO | 2016091312 | 6/2016 |
| WO | 2016095966 | 6/2016 |

OTHER PUBLICATIONS

Kim et al., "User-Centered Approach to Path Planning of Cleaning Robots: Analyzing User's Cleaning Behavior," Proceedings of the 2007 ACM/IEEE Conference on Human-Robot Interaction, Mar. 8-11, 2007, pp. 373-380.
World Intellectual Propert Organization, "International Search Report," and English translation thereof, issued in PCT/EP2018/060871 dated Oct. 10, 2018, document of 8 pages.
Sick Sensor Intelligence, "LMS200/21 1/221/291 Laser Measurement Systems", Jan. 2007, pp. 1-48, XP055581229, http://sicktoolbox.sourceforge.net/docs/sick-lms-technical-description.pdf.
Mahyuddin et al., "Neuro-fuzzy algorithm implemented in Altera's FPGA for mobile robot's obstacle avoidance mission", TENCON 2009—2009 IEEE Region 10 Conference, IEEE, Piscataway, NJ, USA, Jan. 23, 2009; document of 6 pages.
Choset et al., "Principles of Robot Motion", Theory, Algorithms, and Implementations, Chapter 6—Cell decompositions, 2004, document of 41 pages.
Durrant-Whyte et al., "Simultaneous Localization and Mapping (SLAM): Part I The Essential Algorithms", in: IEEE Robotics and Automation Magazine, vol. 13, No. 2, pp. 99-108, Jun. 2006.
Konolige et al., "A Low-Cost Laser Distance Sensor," 2008 IEEE International Conference on Robotics and Automation, Pasadena, CA, USA, May 19-23, 2008, document of 7 pages.
Oh et al., "Autonomous Battery Recharging for Indoor Mobile Robots," Massachusetts Institute of Technology Press, Aug. 30, 2000, document of 6 pages, XP055321836.
Siegwart, "Introduction to Autonomous Mobile Robots", Massachusetts, ISBN 978-0-26-219502-7, (2004), pp. 104-115, 151-163, 250-251, document of 37 pages. http://www.robotee.com/EBooks/Introduction_to_Autonomous_Mobile_Robots. pdf, XP055054850.
Lymberopoulos et al., "A Realistic Evaluation and Comparison of Indoor Location Technologies: Experiences and Lessons Learned," IPSN '15, Apr. 14-16, 2015, Seattle, WA, USA, document of 12 pages. http://dx.doi.org/10.1145/2737095.27.
Neto et al., Human-Machine Interface Based on Electro-Biological Signals for Mobile Vehicles, 2006, IEEE, p. 2954-2959 (Year: 2006).
Forlizzi, How robotic products become social products: an ethnographic study of cleaning in the home, 2007, IEEE, p. 129-136 (Year: 2007).
German Patent Office, "Office Action" issued in German Patent Application No. 10 2017 109 219.6, dated Mar. 23, 2018, document of 20 pages.
World Intellectual Property Office, "Written Opinion of the International Searching Authority" and English translation, issued in International Application No. PCT/EP2018/060871, by European Searching Authority, document of 19 pages, dated Oct. 10, 2018.
Second Office Action dated Dec. 13, 20 2022, in Japanese patent application No. 2019-558418, with translation.
Office Action dated Nov. 11, 2022, in Chinese patent application No. 2018800439462, with English translation.

\* cited by examiner

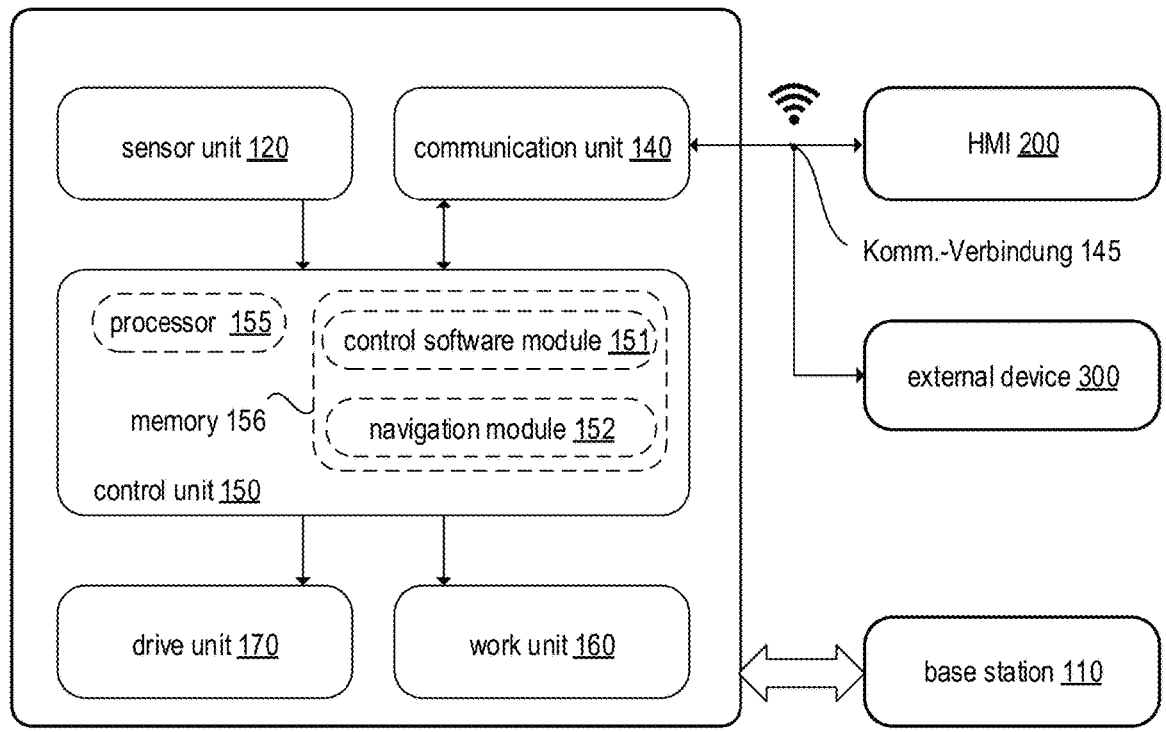
Fig. 3
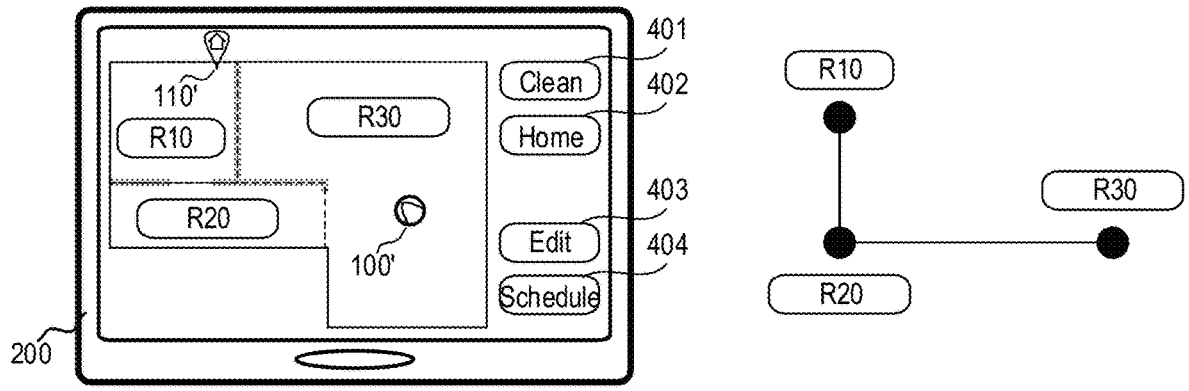
Fig. 4A
Fig. 4B

METHOD FOR NAVIGATION OF A ROBOT

CROSS REFERENCE TO RELATED APPLICATIONS

This application is a § 371 National Phase of PCT/EP2018/060871, filed Apr. 27, 2018, the entirety of which is incorporated by reference and which claims priority to German Patent Application No. 10 2017 109 219.6, filed Apr. 28, 2017.

TECHNICAL FIELD

The present description relates to the field of autonomous mobile robots, in particular to a method for creating a work plan for an autonomous mobile robot.

BACKGROUND

The use of autonomous mobile robots, in particular service robots, both in private households and in the workplace, has been steadily increasing in recent years. Possible applications in these areas include, for example, cleaning robots for vacuuming and/or mopping floor surfaces or security robots that detect possible dangers such as burglars or fires while carrying out inspections. Autonomous mobile robots can also enable communication independent of location or activity and can carry out the transport of objects.

These kinds of autonomous mobile robots generally use a map of their environment to orient themselves while carrying out their respective activities. Robots are also known that compile such a map for targeted navigation using a so-called SLAM algorithm (Simultaneous Localization and Mapping). In this process, the map and the position of the robot on the map are determined with the aid of various sensors. These sensors may include, for example, laser range scanners, cameras, tactile sensors, odometers, acceleration sensors or the like.

A map compiled by the robot can be permanently saved so that the robot can utilize the map for further, subsequent deployments. In this manner, after compiling the map, the robot can be sent to a specific place in order to carry out a task (e.g. cleaning a living room). In addition to this, the work sequence can be made more efficient as the can make use of existing prior knowledge regarding its deployment area to at least partially plan the movements needed to carry out its work in advance.

The autonomous mobile robots presently on offer, however, only allow for a limited planning of the work movements on the part of the user. The user can specify, for example, various points in time, e.g. daily at 9 am, at which the robot is to begin carrying out a task. It is, however, not possible to stipulate the work movements more specifically. Furthermore, programming the robot manually is complicated and time-consuming and can generally only be carried out by an experienced user. The inventors have therefore set themselves the objective of making a more simple and intuitive planning of the deployment of an autonomous mobile robot possible.

SUMMARY

The aforementioned objective is achieved by the method robot having the features and structures recited herein. Various embodiments and further developments are further disclosed herein.

A method for controlling at least one autonomous mobile robot is described. At least one of these robots is configured to navigate an deployment area using a map of this deployment area and to carry out at least one task in this deployment area. The method comprises receiving a work assignment, the work assignment containing instructions for carrying out at least one task in the deployment area, automatically dividing the work assignment into at least two subtasks and automatically determining the sequence in which the at least one robot is to complete the subtasks. After completion of all subtasks the work assignment is considered to be fulfilled.

A further method described here for controlling an autonomous mobile robot that is configured to autonomously complete at least one task in an deployment area at a correspondingly specified time comprises entering a corresponding time point for the completion of at least one task into a time table and receiving a work assignment that is to be carried out immediately, wherein the work assignment contains instructions for the immediate completion of at least one task in the deployment area. The method further comprises testing whether the work assignment that is to be completed immediately conflicts time-wise with one or more of the tasks entered in the time table and, if a conflict is determined, interrupting or omitting the at least one task affected by the conflict and making a decision as to whether, and if so when, a task entered in the time table that is affected by the conflict is to be resumed or started over.

Further, a method for controlling at least one autonomous mobile robot that is configured to carry out a task in a deployment area at a certain point in time is described. The method comprises determining general planning specifications, wherein the general planning specifications refer to an activity of the at least one robot, as well as the automatic planning of times at which a task is to be completed, wherein the planning is carried out while taking into consideration the general planning specifications. The general planning specifications specify that, at specifiable points in time or during specifiable time periods, no tasks will be automatically planned and carried out.

Further, a method for programming an autonomous mobile robot is described. The method comprises displaying a temporal sequence of the tasks to be carried out by the robot on a human machine interface, wherein the temporal sequence encompasses the current task of the robot, planned future tasks of the robot and past tasks of the robot, wherein the tasks may be divided into subtasks. The method further comprises receiving a user command, wherein the user command entails a change to at least one of the planned future tasks or subtasks or the addition of a new task or subtasks.

Further, a method for controlling at least one autonomous mobile robot is described, wherein the at least one autonomous mobile robot is configured to navigate an deployment area using a map of the deployment area and to autonomously carry out at least one task in the deployment area in accordance with entries in a time table, wherein the robot has a rechargeable battery and is further configured to charge the battery at a base station, wherein one of at least two battery charging programs can be chosen to charge the battery and wherein the charging time depends on the chosen battery charging program. The method comprises choosing a battery charging program in accordance with the entries in the time table.

Further, a method for controlling at least one autonomous mobile robot is described, wherein the at least one autonomous mobile robot is configured to navigate an deployment area using a map of the deployment area and to autonomously carry out at least one task in the deployment area, wherein the deployment area has at least one subarea that is saved in the map. The method comprises recognizing when a task in the subarea cannot be completed in accordance with a specification, either automatically or based on a user input, and then dividing the area into new subareas. The division into new subareas enables the task to be carried out in accordance with the specifications.

Further, a method for controlling at least one autonomous mobile robot is described, wherein the at least one autonomous mobile robot is configured to navigate an deployment area using a map of the deployment area and to autonomously carry out at least one task in the deployment area in accordance with a time table plan, wherein the deployment area has at least one subarea that is saved in the map. The method comprises a manual adaptation of the subarea carried out by the user and the automatic adaptation of the time table plan in dependency on the adaptation of the subareas carried out by the user.

Further embodiments refer to a robot that is connected to an internal and/or external data processing system which is configured to execute a software program that, when executed by the data processing system, causes the robot to carry out the methods described here.

BRIEF DESCRIPTION OF THE FIGURES

The present application will now be described with reference to the examples illustrated in the figures. The illustrations are not necessarily true to scale and the application is not limited to the examples illustrated here. Instead importance is given to illustrating the basic principles underlying the present application.

FIG. 3 shows in a block diagram the design of an autonomous mobile robot and its communication possibilities with other (external) devices.

FIG. 4A shows a map of the deployment area from FIG. 1, as well as a possible division of this deployment area.

FIG. 4B shows a topological map based on the division from FIG. 4A.

DETAILED DESCRIPTION

In general, an autonomous mobile robot, as a service robot, autonomously carries out one or more tasks such as, for example, the cleaning or monitoring of a robot deployment area or the transport of objects in the robot deployment area. The area of robot deployment can be, for example, an apartment, a house or an office space. The embodiments described in the following refer mainly to cleaning robots. The disclosure, however, is not limited to the deployment of cleaning robots but is applicable for all conceivable uses involving autonomous mobile robots in which one or more autonomous mobile robots should carry out one or more tasks in a defined deployment area, in which they can move (e.g. navigate) autonomously with the aid of a map.

Figure 1:
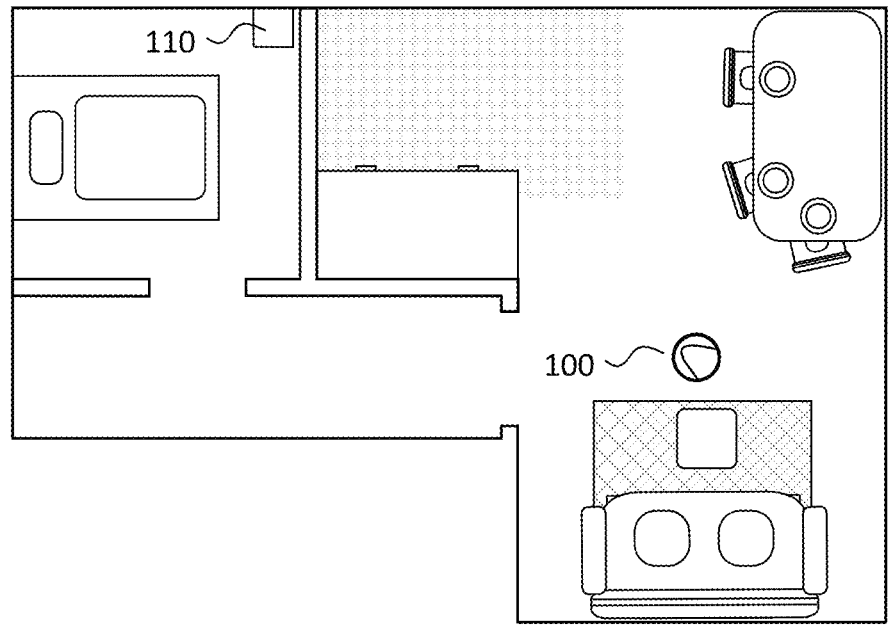
FIG. 1 shows an exemplary robot deployment area and a current position of the robot in the deployment area.

FIG. 1 shows an exemplary deployment area for an autonomous mobile robot 100, as well as its position in the deployment area. The deployment area is, for example, an apartment with numerous rooms. In order to allow for autonomous operations without frequent interaction with the user, a base station 110 may be present at some location within the deployment area. The autonomous mobile robot 100 can return to the base station after completing a task. A rechargeable battery of the robot 100 can be charged at the base station, for example. In the case of cleaning robots such as vacuuming robots, dirt collected during a cleaning run can be disposed of at the base station 110. In the case of mopping robots, a cleaning agent, for example, for applying to the floor surface can be refilled. These, however, are only examples. In general, all of the activities needed before or during a deployment of the autonomous mobile robot 100 can be carried out at the base station 110.

Figure 2:
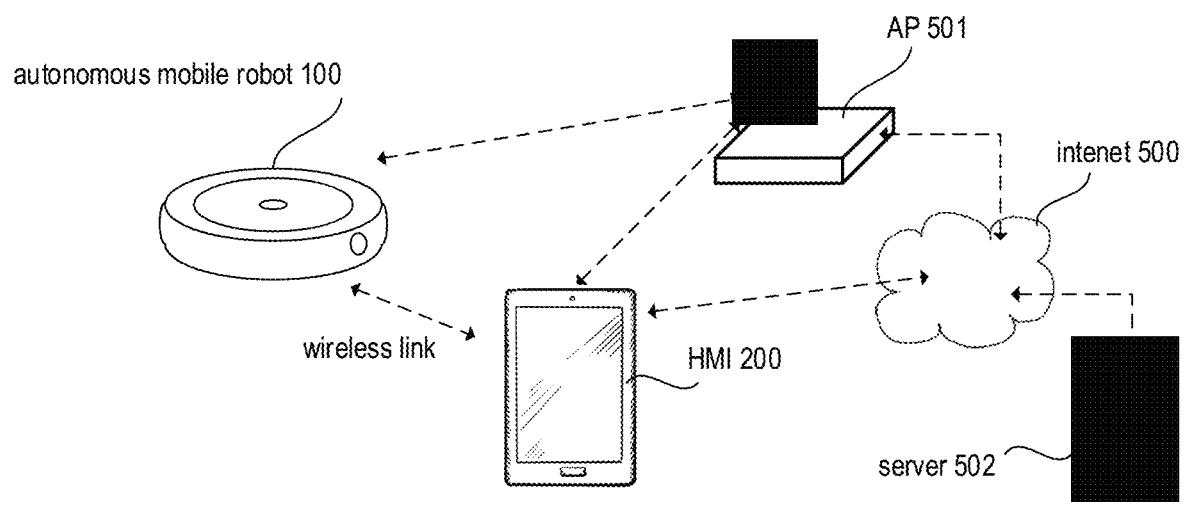
FIG. 2 shows a system with an autonomous mobile robot, a human machine interface and a server that can communicate via a network connection.

FIG. 2 shows an example of how an autonomous mobile robot 100 can be integrated into a home network, which, for example, can be a wireless network (WLAN, ZigBee). In the present example, a WLAN access point (AP) 501 enables the robot 100 to communicate with a human machine interface (HMI) 200, as well as with an external computer or server 502 (e.g. a cloud server) that is accessible via Internet 500. Additionally or alternatively, the HMI 200 can also set up a direct (wireless) communication connection to the robot 100. Such a direct (wireless) communication connection may be, for example, a Bluetooth or NFC connection (Near Field Communication). Any other suitable connection, however, may also be used.

FIG. 3 shows examples of the various units (modules) of the autonomous mobile robot 100 from FIG. 2 in a block diagram. Such a unit can be an independent component or part of a software for controlling the robot. The software responsible for controlling the behavior of the robot 100 (which includes a control software module 151 and a navigation module 152, see FIG. 3) can be executed by the control unit 150 of the robot 100 (using a corresponding processor 155 and memory 156). The control unit 150 can carry out some operations at least partially with the aid of an external computer. This means that the computing effort needed for the control unit 150 can, at least partially, be outsourced to an external computer accessible, for example, via a home network or via the Internet (Cloud).

For the most part, the robot operates autonomously. In order to enable the robot to operate without frequent interaction on the part of the user, it possesses, for example, a base station 110 to which it automatically returns after completing a task. Here, for example, the robot can charge its batteries and/or (in the case of a cleaning robot) dispose of collected dirt.

The autonomous mobile robot 100 has a drive unit 170 that may comprise, for example, electromotors, transmissions and wheels and with the aid of which the robot 100 can—at least theoretically—access any point in its deployment area. The drive unit 170 can be configured, for example, to carry out transform commands or signals into a movement of the robot 100.

The autonomous mobile robot 100 has a communication unit 140 for establishing a communication connection 145 to the human machine interface (HMI) 200 and/or other external devices 300. The communication connection may be, for example, a direct wireless connection (e.g. Bluetooth), a local wireless network connection (e.g. WLAN or ZigBee)

or an Internet connection (e.g. to a cloud service). The human machine interface 200 can display to the user information regarding the autonomous mobile robot 100 (e.g. charge level of the battery, current work assignment, map data (i.e. information saved in a map such as a cleaning map, etc., hence—position related information), and can receive user commands for the robot 100 to carry out a work assignment.

Examples of human machine interfaces 200 include tablet PCs, smart phones, smart watches, computers or smart TVs. A human machine interface 200 can also be directly integrated in the robot, allowing the robot to be operated by means of keys, gestures and/or voice inputs and outputs. Examples of external devices 300 include computers and servers to which computing tasks and/or data can be outsourced, external sensors that provide additional information or other household devices (e.g. other autonomous mobile robots 100B) with which the autonomous mobile robot 100 collaborates or exchanges information.

The autonomous mobile robot 100 may have a work unit 160 such as, for example, a cleaning unit for cleaning a floor surface (e.g. brushes, vacuuming equipment) or a gripper arm for picking up and transporting objects. In some cases, for example, in the case of a telepresence robot or a security robot, a different component is used to carry out the specified tasks and a work unit 160 is not needed. Hence, a telepresence robot possesses a communication unit 140 that is coupled to a human machine interface 200 and that has a multimedia unit consisting, for example, of a microphone, a camera and a display screen, enabling numerous people separated by great distances to communicate with each other. A security robot on an inspection patrol detects unusual events (e.g. fire, un-extinguished lights, unauthorized intruders, etc.) with the aid of sensors and informs, for example, a user or a control center thereof.

The autonomous mobile robot 100 can have a sensor unit 120 with various sensors, for example, one or more sensors for detecting information regarding the environment of the robot such as, e.g. the position of obstacles or of navigation features (e.g. land marks) in the robot's deployment area. Sensors for detecting information regarding the environment include, for example, active sensors for measuring the distance to objects (e.g. walls, obstacles, etc.) in the environment of the robot such as, for example, optical and/or acoustic sensors that can use triangulation or travel time measurements of an emitted signal to measure distance (triangulation sensors, 3D cameras, laser scanners, ultrasonic sensors). Other common examples of suitable sensors include passive sensors such as cameras, tactile or touch-sensitive sensors for detecting obstacles, floor clearance sensors (e.g. for detecting potentially dangerous ledges, a stair step, etc.), sensors for determining velocity and/or the path travelled by the robot such as, e.g. odometers, inertial sensors (acceleration sensors, rotation rate sensors) for determining changes in the pose and movements of the robot or wheel contact sensors that detect a contact between a wheel and the floor.

The aforementioned control unit 150 can be configured to provide all of the functions that are needed for the autonomous mobile robot 100 to be able to autonomously move throughout its deployment area and to carry out a task. For this purpose the control unit 150 has, for example, a processor 155 and a memory 156 for executing a control software of the robot 100 (see FIG. 3, control software module 151). Based on the information provided by the sensor unit 120 and the communication unit 140, the control unit 150 generates the control commands or control signals for the work unit 160 and the drive unit 170. The drive units can transform these control signals or control commands into a movement of the robot. The control software module 151 may include software functions for object recognition and for work planning.

In order that the robot be able to autonomously carry out a task, a further software module is provided in the form of a navigation module 152. The navigation module 152 can include software functions for the navigation of the robot (e.g. map management, map-based path planning, self-localization of the robot on the map, SLAM algorithms, etc.). Naturally, the control software module 151 and the navigation module 152 are capable of interacting, collaborating and of exchanging information. This makes it possible for the robot to orient itself and navigate in its environment by means of, for example, navigation features such as land marks. The navigation module 152 may operate using, for example, an obstacle avoidance strategy (obstacle avoidance algorithm), a SLAM algorithm (Simultaneous Localization and Mapping) and/or one or more maps of the area of robot deployment. When doing so, in particular obstacles are detected and their position is determined with the aid of sensor measurements. The position of obstacles can be saved in the form of map data. This method is generally known and will therefore not be discussed further in detail here.

The robot can compile the maps of the robot deployment area anew during its deployment or it can use a map already existing at the beginning of the deployment. An already existing map may have been compiled, for example, during a previous deployment by the robot itself, for example, while carrying out an exploratory run or it may be provided by a different robot and/or a user and permanently stored, for example, in a non-volatile memory 156. As an alternative, the maps of the robot deployment area that are to be permanently saved can also be saved outside of the robot, for example, in a computer in the user's household (e.g. tablet PC, home server) or in a computer accessible via Internet (e.g. cloud server). In the example of FIG. 3 the map is contained in the navigation module 152.

In general, an (electronic) map used by the robot 100 is a collection of map data that stores location-based information regarding the deployment area of the robot 100 and the environment in this deployment area that is relevant to the robot 100. One kind of location-based information that is saved in a map can be information regarding the position of objects in the robot deployment area. These objects may be obstacles such as, e.g. walls, doors, pieces of furniture or other movable and non-movable objects into which the robot (at least theoretically) could collide. A robot base station 110 may also be one of the objects designated on the map. The position of objects (obstacles) is generally defined using coordinates. A further kind of map data is location-based information regarding the performance of a task of the robot 100 such as, for example, which parts of a floor surface are to be processed, in particular cleaned, or which points (in the area of robot deployment) the robot accessed while carrying out its task. A further kind of location-based map data can be the division of the robot deployment area into numerous rooms and/or subareas. This division can be carried out automatedly by the robot 100 or with the aid of the user. The user can carry out the division manually or manually revise a division that was performed automatically. The designation of rooms (e.g. "room 1", "room 2", "corridor", "kitchen", "living room", "bedroom", etc.) can also be a part of the map data. It is possible to determine, for example, with regard to a subarea and/or a room, whether or not the area is allowed to be accessed. For example, a subarea may be bordered off as a virtual exclusion area when, for example, the area cannot be safely entered by the robot 100. Alternatively or additionally, the user can save, revise and delete user-defined subareas. User-defined subareas may define areas that the robot 100 is not allowed to enter (exclusion regions) or particular areas that the user want to have regularly or periodically cleaned. Different maps can be saved for different robot deployment areas such as, for example, the different floors of a house.

The navigation module 152 can be configured to allow the determined exclusion regions that the robot 100 is not allowed to autonomously enter or travel through while navigating to be marked on the maps. This is done, for example, by the control unit 150 treating an area marked as a virtual exclusion region as if the exclusion region were an obstacle in the deployment area of the robot 100. In order to prevent the robot 100 from entering the exclusion region, the control unit 150 of the robot 100 can make use of an obstacle avoidance strategy, also known as obstacle avoidance algorithm, which is configured to control the robot 100, based on the position of recognized obstacles, to prevent it from colliding with the obstacles. Based on the virtual exclusion regions saved in the map data, the position of one or more exclusion regions can be determined. These positions can then be used by the obstacle avoidance strategy in the same way as if a real obstacle stood at this position. Thus it can be easily ensured that the robot 100 will not autonomously enter and/or travel through a virtual exclusion region.

FIG. 4A shows an example of a map of the exemplary deployment area from FIG. 1 that has been compiled by the robot 100. The map can be displayed, e.g. on an HMI 200 or on a tablet PC. Control buttons or control elements 401, 402, 403, 404 are displayed next to the actual map of the deployment area. Four control elements 401, 402, 403, 404 are exemplarily illustrated in FIG. 4A. This, however, is only an example. It may be that more or fewer control elements 401, 402, 403, 404 are shown. In some views, for example, no control elements 401, 402, 403, 404 at all might be shown. The control elements 401, 402, 403, 404 can be used by the user to give commands for controlling the robot 100. For this purpose, the control elements 401, 402, 403, 404 can be correspondingly labeled. In the present example, the control elements 401, 402, 403, 404 are labeled, for example, "Clean", "Home" and "Schedule".

By touching or activating the control element "Clean" 401, for example, a cleaning of the entire area of robot deployment can be started. For autonomous mobile robots that are not, or not exclusively, intended for the cleaning of surfaces, for example, other or additional control elements can be provided for starting one or more other tasks. Touching or activating the "Home" control element 402, for example, quickly directs the robot 100 back to its base station 110. When this takes place, for example, a task that is currently being carried out can be put on pause, interrupted or discontinued upon sending the robot 100 back to its base station 110. By touching or activating the "Edit" control element 403, for example, the user can manually correct a division of the robot deployment area that was previously completed (by the user or the robot) and/or adapt it to their/her preferences. This is done, for example, by correcting the borders of the previously determined subareas or by adding or removing subareas. Such a procedure, however, is generally known and will therefore not be discussed here in greater detail. Touching or activating the "Schedule" control element 404, for example, switches the display to a different view, e.g. to a time table view. This means that, instead of the map view shown in FIG. 4A, a time table view will be displayed on the HMI 200. A time table view, for example, can display all current, planned and/or past activities of the robot 100 and can enable the planning and/or control of future deployments. For these purposes, a weekly overview of the days Monday (Mon.) through Sunday (Sun.) can be displayed, for example. In addition to this or as an alternative, the previous, current and following days can be displayed. For example, the preceding three days and the following three days can be displayed with the result that, together with the current day, seven days (that is, one week) are displayed. Additionally or alternatively, the user can browse through (scroll) the daily view. The current day can be highlighted using, for example, a certain color or marking (e.g. the label "today").

Instead of activating a control element 401, 402, 403, 404, one or more tasks that are to be carried out in one of the subareas can be assigned to the robot 100, for example, by touching on or selecting the subarea. Additionally or alternatively, by touching on one of the subareas, an additional window can be opened on the HMI 200 that provides additional information and/or control possibilities. These subareas can be correspondingly marked on the map, for example. The subarea can be designated, for example, using a name or number. In the example shown in FIG. 4A, the subareas are labeled, for example, R10, R20 and R30. The subarea R10 can be a bedroom, the subarea R20 a hallway and the subarea R30 a living room, for example.

The current position of the robot 100', as well as the position of the base station 110' can also be displayed on the map. In addition to this, depending on the kind of robot', further information such as the position of obstacles, of already cleaned surfaces, of a measured degree of dirtiness or of a planned route for a monitoring patrol can also be displayed.

The HMI 200 shown in FIG. 4A, which allows for user interaction over a displayed map with touch input, however, is only an example. Comparable user interaction can also be provided by a PC with mouse input, for example. A further possibility for providing interaction between the user and the robot 100 is, for example, over voice input and output using, for example, voice commands (e.g. "Start cleaning", "Clean living room", etc.).

Figure 5:
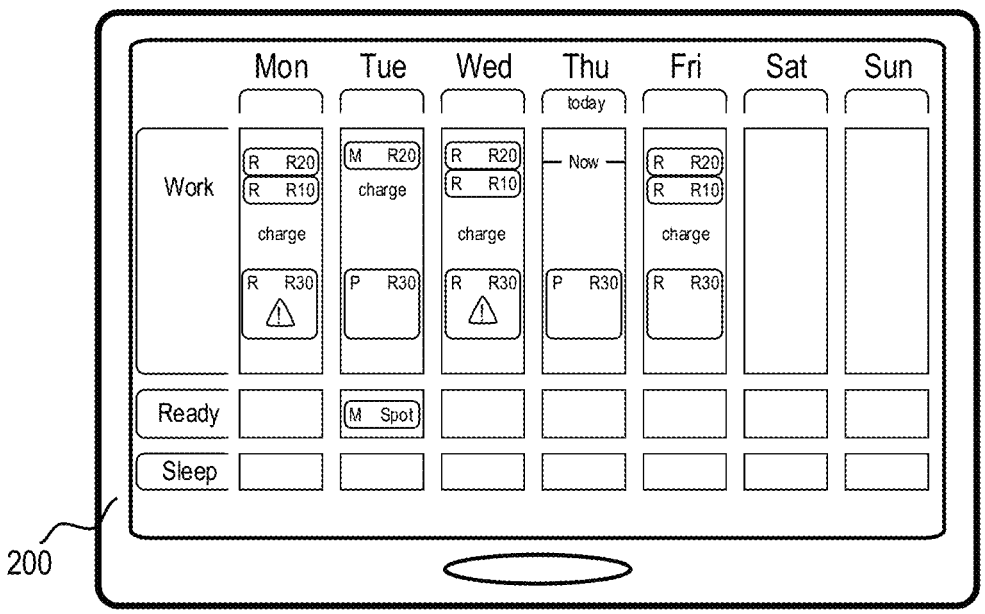
FIG. 5 shows an exemplary view of a time table.

FIG. 5 shows an example of a possible time table view in the form of a weekly overview, wherein the current day is designated (e.g. "today"). In the weekly overview, for example, past deployments, current deployments and deployments planned for the future are displayed in a single overview. It is, however, also possible to display past deployments, current deployments and future planned deployments separately, each in its own view. Many other possible displays are also possible. For example, the current day and a specifiable number of past and/or future days can also be displayed. The user can browse (scroll) through the various views. For example, with a swipe gesture the user can switch the touch display to a different day or other view.

In the weekly overview in FIG. 5, various deployments or tasks at various times on various days are shown. It is generally possible to differentiate between various kinds of deployment. In FIG. 5, for example, these are designated as "R", "M" and "P". Those designated as "R" deployments, for example, are regularly planned deployments that take place in regular intervals (e.g. daily, weekly or in any other chosen interval). Those designated as "P" deployments are, for example, one-time, planned deployments. Such deployments may entail, for example, that the robot cleans a certain room or subarea at a certain time on a certain day. Those designated as "M" deployments, for example, may be deployments manually started by the user that are to be carried out immediately. Such manually started deployments are, in accordance with their definition, not shown to be planned for the future. As a rule, only past or currently running, manually started deployments can be shown. Distinguishing between the various kinds of deployments using letters, however, is only an example. They may also be designated using colors or any other kind of symbol.

In general, various other information can also be shown to the user in the time table view as an alternative or additionally. For example, the duration of a depicted deployment can also be displayed. As FIG. 5 exemplarily illustrates, the duration of a deployment can be indicated, for example, by the size of the displayed entry. It is also possible to additionally or alternatively show (e.g. in an hourly view) the starting time, the presumed ending time (of currently running deployments or of those planned for the future) and/or the actual ending time (of past deployments). In the case of currently running deployments, for example, it is possible to show how much of the task has already been completed and the estimated time needed to complete the rest of the task. For example, in the case of a cleaning robot, it is possible to show what portion of the floor surface to be cleaned has already been cleaned, what portion of the surface remains to be cleaned and how much time will presumably be needed to clean it. Other parameters relating to the performance of a task can also be displayed such as, for example, the energy consumed by the task or the amount of dirt collected.

In addition, the times at which the battery of the robot 100 has been and/or is to be charged can also be designated, as well as the times at which other materials are refilled. This makes it easier for the user to recognize and understand the reasons for pauses between deployments during which the robot 100 did not or cannot carry out a task. Unusual events can also be designated in this manner, for example, using a "Warning" symbol. This makes it possible to display to the user when a deployment was not able to be completed as planned. It may be, for example, that the user interrupts a task or that the deployment, for some reason, is not carried out or is not completed. It is also possible to display, for example, when a deployment was able to be carried out faster than anticipated or when it was carried out more slowly.

Further, the displayed time can be divided into various robot activity modes (also known as robot modes). The activity modes (robot modes) of the robot 100 can describe, for example, the activity or behavior that the user may expect from the robot at the designated times. For example, a robot 100 can have a work mode, a ready mode and a sleep mode. When the robot is in the work mode, for example, it carries out planned deployments that it starts and carries out automatically. When the robot 100 is in ready mode, no deployment has been currently assigned for the robot 100 to carry out, but it is in a standby mode and can be started by the user at any given moment. As opposed to this, in sleep mode the robot 100 has no pending deployments to carry out. Nor can it be started by the user and no deployments have been planned by the user for this time period. The various activity modes will be described in greater detail further below.

In order to make the display easier to understand, the time scale shown in the time table view can be scaled in various ways. For example, in the example shown in FIG. 5 the work mode "Work" is displayed larger than the other activity modes "Ready" and "Sleep". Alternatively, an activity mode can also be completely hidden.

The user, for example, can change the plan of a deployment of the robot 100 that is planned for the future, for example, in order to have it carried out at a different point in time, by touching and/or sliding a displayed deployment. By touching or selecting a task, for example, additional information regarding the task and the subtask or subtasks into which the task is divided can be displayed. Such information may include, for example, the size of a subarea, the estimated resource consumption (e.g. the required time and energy), the time point of the preceding robot deployment, e.g. of the last cleaning of a subarea, the time point of the next planned robot deployment, e.g. of the next cleaning of a subarea, statistics regarding the previous deployments (e.g. the previous ten deployments) such as, for example, the consumption of resources that took place during the previous deployments (e.g. the time required), the average amount of time required for processing, collecting dirt, etc. and any problems that might have arisen during previous deployments.

By touching or selecting a task, further possibilities for adjusting the corresponding task and the subarea or subareas in which the task is to be carried out become available. These adjustments can include, for example: the renaming of a subarea, adjusting the intensity of the activity in the subarea (e.g. vacuuming strength, the number of cleaning runs (how often the robot cleans a subarea during a single task), the frequency of patrols, etc.), establishing exclusion regions, the time of the next cleaning, the repetition frequency (e.g. daily, weekly, etc.), as well as adjustments to the display and regarding the compilation of statistics.

The systems presently available only allow the user to plan the deployment of an autonomous mobile robot 100 to a limited extent by means of a time table function. Such systems allow the user, for example, to set a starting time for a task, e.g. "Clean living room daily at 9 am". However, they do not give the user the possibility of making more specific stipulations regarding how the task is to be carried out such as, for example, determining a sequence in which the rooms or subareas are to be cleaned or to recognize how much time the robot 100 will presumably need for a task.

More complex systems do allow a task of the robot 100 to be broken down into subtasks. In these, for example, the task "Clean apartment" can be broken down into the subtasks "Clean living room", "Clean bedroom" and "Clean hallway". The user can then manually determine the sequence in which the subtasks are to be carried out. Carrying out such adjustments manually, however, is very complicated and time-consuming and can generally only be performed successfully by an experienced user. The present disclosure allows for a more intuitive and, in particular, for an easier work planning when carrying out the tasks and subtasks.

Typical work tasks in households include, for example, "Clean the apartment" for a cleaning robot or "Check whether everything is ok" for a security robot. A person often breaks such tasks down into subtasks. For example, cleaning an apartment may be carried out room by room, first, for example, the bedroom, then the hallway and finally the living room. A monitoring task can also be broken down into subtasks in a similar manner. Such subtasks may include, for example, "Are all windows closed?" or "Have all electric devices been turned off?", "Check the bedroom", etc. In order for the behavior of the robot to be rendered more understandable for a person, it is oriented towards this course of action.

This means, for example, that the robot recognizes, automatically and/or based on user inputs, structures in its environment such as individual rooms, enters these into its map and, based on this, breaks down a task assigned by a user into subtasks. Methods for dividing a mapped area into subareas and, in particular, into rooms are generally known and will therefore not be discussed in greater detail here. The breaking down of a work assignment into subtasks will be exemplarily described in the following.

Figure 6:
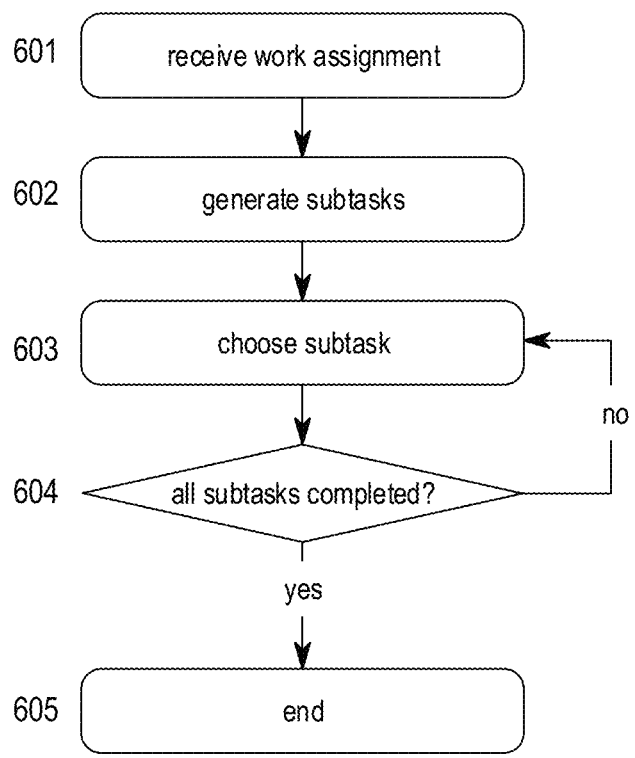
FIG. 6 shows an exemplary workflow of a method for carrying out a work task.

FIG. 6 shows a possible method for creating a plan for carrying out a task based on the division into subtasks. By touching the "Clean" control button 401 shown in FIG. 4A, for example, the user can generate a work assignment for the complete cleaning of the apartment that is either to be carried out immediately or is to be entered into a time table for completion at a later point in time (Receive work assignment, Step 601). Because of the complete division of the robot deployment area into subareas, the task of completely cleaning the apartment is fulfilled by cleaning all of the subareas (in particular, bedroom, hallway and living room). The work assignment "Clean the apartment" is thus broken down into the subtasks "Clean bedroom", "Clean hallway", and "Clean living room" (Generate subtasks, Step 602). This division into subtasks, however, is only an example. In accordance with another example, the robot 100, for example, can vacuum and wet mop the floor surface. Or it may be possible that two robots 100 are available, of which a first robot can vacuum the floor surface and a second robot can wet mop the floor surface. The work assignment can then, for example, be broken down into the subtasks "Vacuum the apartment" and "Wet mop the apartment". It is also possible to additionally carry out a division into subareas. The subtasks could then be, for example, "Vacuum bedroom", "Vacuum hallway", "Vacuum living room", "Wet mop bedroom", "Wet mop hallway" and "Wet mop living room".

In a following step a sequence for processing the subareas is determined. For this purpose, for example, the structural arrangement of subareas in a graph or topological map can be used. In this case, nodes and edges, for example, can be assigned to every subarea, wherein the nodes are connected to edges. The edges describe how the subareas can be accessed (that is, in particular, which rooms are connected by doors). FIG. 4B shows an example of a topological map that was compiled based on the division form FIG. 4A. At this point it should be noted that apartments with more rooms and, accordingly, with more subareas may result in complex topological maps that have many branches. In addition to this, further information may be included into the topological map that characterizes the subarea or the connection between two subareas such as, for example, the size of the rooms, the type of floor covering or the deployment duration that can be expected.

As described above, one or more subtask can be assigned to each node. In this way, generally known algorithms for graphs and topological maps can be used to determine the sequence in which the subtasks are to be completed. For example, Monte Carlo algorithms or the Dijkstra algorithm can be used to determine the sequence of the processing. When determining the sequence, any other desired parameter can also be applied to help find the best solution (e.g. the shortest path or the fastest processing of the entire work deployment).

In one simple example, the subtask that is selected to be the first subtask may be the subarea in which the robot 100 is currently located (Choose subtask, step 603). This, for example, can be the subarea in which the base station 110 at which the robot charges its battery is located. This allows for the subtask to be started immediately. If only one subtask has been assigned for a particular subarea, no further sequence need be determined for this subarea. If numerous subtasks are assigned for a subarea they can be arranged in a logical sequence (e.g. vacuuming before wet mopping). The sequence can also be determined in accordance with specifiable criteria that define a priority (e.g. first check whether there is a fire or smoke in the room, then check whether the windows are closed). A random sequence is also possible if the individual subtasks in a subarea all have the same priority. Then, once the subtasks of a subarea have been completed, any desired subtask that has not yet been arranged in a sequence can be selected as the next subtask. In this case, for example, the subtask is selected that is linked to the subarea that can be accessed by the robot 100 in the shortest amount of time. This can be, for example, a subtask in a neighboring subarea. There may be, for example, numerous subtasks to complete in this neighboring subarea. This step is repeated until all of the subtasks have been included in a planned sequence (All subtasks completed? step 604).

Here it should be pointed out that planning the work of the autonomous mobile robot 100 as described here by way of example starts in the subarea in which its base station 110 is located. This means that the processing, in particular, the cleaning of the subtasks may end in a remotely located subarea. It may not be desirable, however, for the robot to travel over the floor surfaces that have already been cleaned with a collector bin full of dirt and/or with dirtied actuators such as brushes as this could once again dirty the surfaces. In order to avoid this, the processing can be planned in the opposite sequence, making the subarea in which the base station is located the last to be processed. In this manner, movement over previously cleaned surfaces can be reduced to a minimum.

After all of the subtasks have been included in the work plan (End, step 605), the return of the robot 100 to its starting point and/or to the base station, for example, can be planned. When the user gives a direct work assignment ("Clean the apartment") to the robot 100, the robot 100 can automatically begin carrying out the task immediately. In addition or as an alternative to this, the user can have the generated plan shown to him and can adjust it, for example, adapting it to their needs before the robot 100 begins the processing. In particular, the user can change the sequence of the subtasks. The user may want, for example, the robot to begin in a specifiable room (e.g. where it is currently located). In such a case, the sequence in which the subtasks are completed is updated in accordance with the wishes of the user.

Additionally or alternatively, the thus generated work plan can be entered into a time table. In this case the work plan will be carried out at the time specified in the time table. The specified time can be freely chosen by the user and can be repeated in suitable intervals. The user, for example, can specify the starting time for carrying out the subtasks that is to be entered in the time table when assigning the task. In addition or as an alternative, the user can, at any given time, determine, postpone or delete the starting time for carrying out the subtasks. The work plan can be displayed, for example, in a time table view as shown in FIG. 5.

As mentioned above, the described method for planning the performance of a task by breaking the task down into subtasks based on the structure of the environment is also suitable for breaking down a general task into subtasks to be carried out by numerous robots. This enables numerous robots to carry out, either in the same deployment area or in the same deployment subareas, corresponding tasks, which may be the same or different tasks for the different robots, as well as enabling different robots to carry out the same or different tasks in different subareas.

For example, the structure of the environment may be the floors of a multistory house in which a robot for carrying out a task (e.g. cleaning) is located on each floor. A work assignment "Clean the house" for a two-story house can be broken down into the subtasks "Clean the $1^{st}$ floor" for the robot on the $1^{st}$ floor and "Clean the $2^{nd}$ floor" for the robot on the second floor. The subtask assigned to each of the robots can be further broken down in accordance with the procedure described above.

In a further example, a vacuuming robot and a mopping robot are deployed together in one deployment area. Here, as described further above, there may be specifications that have to be fulfilled. For example, a subarea may first have to be vacuumed and then wet mopped. It may, however, be the case that not all subareas should be mopped (e.g. areas that have carpets). It may also be that subareas that have been mopped should not be travelled over (again) by the vacuuming robot. In addition, the mopping robot may have to regularly refill a cleaning agent at an accordingly equipped base station.

In accordance with this example, a work assignment "Clean the apartment" can be broken down into a first assignment "Vacuum the apartment" for the vacuuming robot and into a second assignment "Mop the apartment" for the mopping robot. The assignment "Vacuum the apartment" can be further broken down into subtasks for the vacuuming robot in accordance with the subareas. The assignment "Mop the apartment" can be broken down into subtasks for the mopping robot depending on the subtasks of the vacuuming robot. When doing so, a task for the mopping robot is always planned for when the specifications regarding the processing have been fulfilled (that is, in particular, after the vacuuming robot has cleaned the subarea).

The sequence of the subtasks for the vacuuming robot can in this case be determined to ensure that both robots finish their shared cleaning assignment as quickly as possible. In particular, the sequence of the subtasks can be determined such that the vacuuming robot carries out the last subtask in the subarea in which its base station is located, as described above. In this case the mopping robot will mop this subarea after the vacuuming robot has completed its activity. Beforehand, the mopping robot can mop the subarea that was previously cleaned by the vacuuming robot.

For planning a work assignment for numerous robots, a communication connection between the robots and/or a central planning entity can be provided. In particular, all of the robots may receive a work assignment via the same HMI 200. Accordingly, the HMI 200 can carry out the complete break down of the work assignment and send the sub-assignments to the respective robots.

As an alternative, the HMI 200 can divide the work assignment into individual assignments for the robots (e.g. "Clean the floor"). This work assignment for the robot can then be broken down by the robot into further subtasks.

In a further example, the work assignment can be sent to one of the robots, which then divides the assignment into subtasks (or into individual assignments for the robots). For example, a vacuuming robot can take over the work planning for a mopping robot as all the information needed to do so can be made available to the vacuuming robot. Alternatively, the robots can use decentralized algorithms to determine a division of the work assignment into subtasks among themselves.

As a further possibility, the work assignment can be divided into subtasks on a cloud server or a home server that is connected to the HMI 200 and the robots 100 and to which the required map data is available. Thanks to the high computing capacities of such external computers, even complex computations, for example, can be carried out to obtain an optimal work plan.

The anticipated resource consumption for every subtask can be determined. Resources here include, for example, the time required to complete the (sub-)task, the energy required to complete the (sub-)task, the amount of cleaning agent that will have to be applied to a floor surface or the needed capacity of a collector bin for dirt (e.g. dust).

The resource consumption depends, for example, on the parameter adjustments made by the user for completing a (sub-)task (e.g. vacuuming strength, amount of cleaning agent used), as well as on the environment in which the (sub-)task is to be carried out. Accordingly, it may be necessary to recalculate the resource consumption if the user carries out changes to the adjustments and/or to the structure marked in the map of the environment on which the subtask is based (in particular to the division of the subareas). In addition to this, the estimation of the resource consumption can be adapted to changes in the environment that were not made by the user via the HMI 200. These can include, in particular, home furnishings (e.g. new chairs that are easier or more difficult to travel around) or a change in the floor covering (e.g. a new carpet).

The estimation of the resource consumption can also be carried out with the aid of mathematical models or based on empirical values from previous deployments. In the latter case, the resource consumption is based, for example, on empirical values gathered during previous work deployments in the deployment area. To this end, for example, the amount of time, energy, etc. needed for a subtask in a subarea can be saved after the subtask has been completed. These saved values can then be used to estimate the expected consumption of a subsequent deployment.

The estimation can be further improved by basing it on the empirical values gathered during numerous work deployments. In this case, for example, the amount of time needed and of energy consumed, etc. can be saved after every completion of a subtask in a subarea. For the estimation then, for example, the average amount of resource consumption of the previous ten (or more/or fewer) deployments can be used. Alternatively, a certain amount can be added to the average as a reserve. This reserve can be a fixed percentage of 5%, 7%, 10% or 15% of the average resource consumption, for example, or it can be determined based on the standard deviation in the amounts of resources consumed in the previous deployments.

When the robot enters a deployment area for the first time, it has no empirical values on which it could base an estimation of the expected resource consumption. In this case the estimation can be based, for example, on the empirical values gathered by other robots in other areas that have similar characteristics. It may be known, for example, that a specific type of robot in a given work mode needs on average one minute for the cleaning of each square meter of the surface to be cleaned. Based on this information and on the size of the subarea noted on the map, the time that can be expected to be needed to complete the (sub-)task can be determined. When one robot is removed and replaced by another robot it is also possible to first of all pass the consumption values determined by the previously deployed robot on to the new robot. The new robot can then adapt and update the values after having completed one or more work assignments in the given area.

Here it is necessary to point out that estimating the resource consumption based on the surface to be processed may be quite easy but nevertheless produces a very rough estimate. A more precise estimate can be obtained, for example, by also taking into consideration the geometry of the subarea, the obstacles located in the subarea and the kind of floor covering found in the subarea. For example, a long, narrow subarea (e.g. hallway R20 in FIG. 4) can be cleaned more quickly than a square subarea that has the same surface area as, in the case of the hallway, the robot can cover the same total amount of surface area by running a few parallel laps. A long path can be travelled over by the robot relatively quickly, whereas the turning maneuver needed to steer the robot onto the next path to be cleaned requires, in comparison, much more time. A convex subarea can be covered by running parallel laps with no interruption, whereas a concave subarea generally requires the robot to repeatedly travel over previously cleaned surfaces and causes a higher consumption of time and other resources. A carpeted floor exhibits increased friction resistance as compared to a hard floor, which can also increase the energy consumption. Obstacles located in the area such as chairs have to be circumvented, for which an increased amount of time and other resources may also be needed.

While carrying out or after completing a subtask, the robot can compare the actual consumption of resources with an estimated consumption value. If, when doing so, a deviation is determined, it may be necessary to correct the work plan. Thus, if the cleaning of a subarea is determined to have taken longer than planned, the starting time of the following deployment can be put back. Batteries may need more time for charging and may have to be repeatedly recharged. The estimates of resource consumption for future (sub-)tasks will in such cases have to be adapted to the deviation in the given value.

Figure 7A:
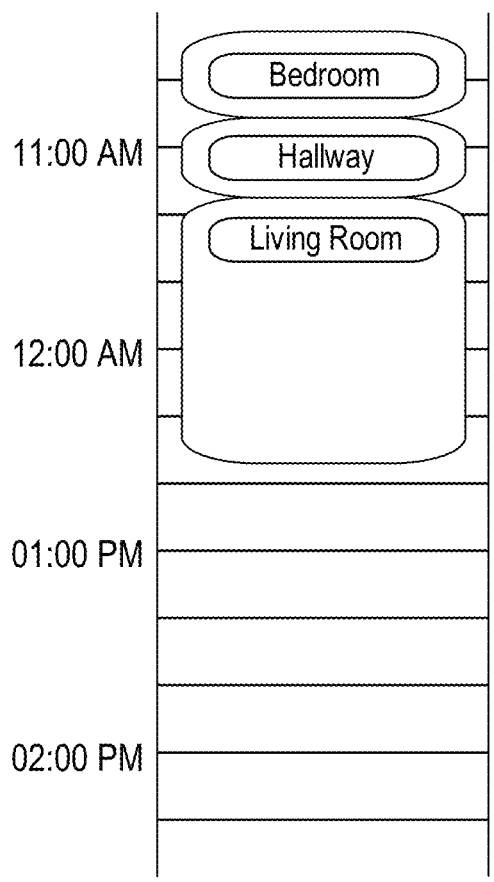
FIGS. 7A-7E show examples for dividing a work task into subtasks based on the map of the deployment area from FIG. 1.

FIG. 7A shows an exemplary illustration of the planned work sequence for the cleaning of the deployment area shown in FIG. 4A. Here the size of a block that depicts a subtask corresponds to the expected amount of time needed to complete the subtask. In particular, the height of the illustrated block is proportional to the expected amount of time needed to complete a subtask. This allows the user to easily recognize, how much time for each (sub-)task will be required and when the robot will begin to carry out a new (sub-)task (in particular, the following (sub-)task. Other ways of displaying this information are also conceivable.

In particular, the user can be shown when a planned subtask will begin. For this the corresponding time of day can be displayed next to the task that is to be carried out. This allows the user to arrange their schedule to accommodate the robot's work. While the robot is working through the work plan it may happen that a subtask is completed more quickly (or more slowly) than expected. In this case the starting time of the following subtasks can be correspondingly moved forward (or back).

Alternatively (for example, if desired by the user), a subtask can always be carried out at the previously determined starting time. If, after completing a preceding subtask, there is still time left until the starting time of the following task, the robot can wait to begin the new subtask until the starting time or it can carry out a different activity in the meantime. In this way the user can additionally use the robot to remind him of something at a certain point in time (e.g. alarm-clock function). When the robot, for example, enters the bedroom at a previously specified time, the user will be woken up by the robot's activity. The robot can also make use of the available time, however, to charge its batteries, to dispose of dirt or to carry out an additional quick cleaning of a particularly dirty area such as, for example, the corner of a room. Alternatively, the robot can also move to a previously determined location (in particular the base station), where the user can carry out maintenance tasks such as emptying the collector bin. As a further alternative, the robot can conduct a monitoring task such as detecting the presence of other persons, the status of household devices or it can check whether specific areas of the deployment area are accessible (e.g. whether the doors of rooms are closed or open).

Once the expected resource consumption for the completion of a (sub-)task is known, it is then also possible to check before beginning a subtask whether there are enough resources available to completely finish the task. In particular, when planning subtasks it is possible to check the amounts of the resources that are left after carrying out a subtask and that will then be available for carrying out the subsequent subtask(s). For example, it may be that a time has been specified during which the robot is not to be allowed to carry out any tasks (e.g. sleep mode). If it is determined that the completion of a subtask would normally take place within this period of time, carrying out the subtask can be postponed until the next available point in time.

Figure 7B:
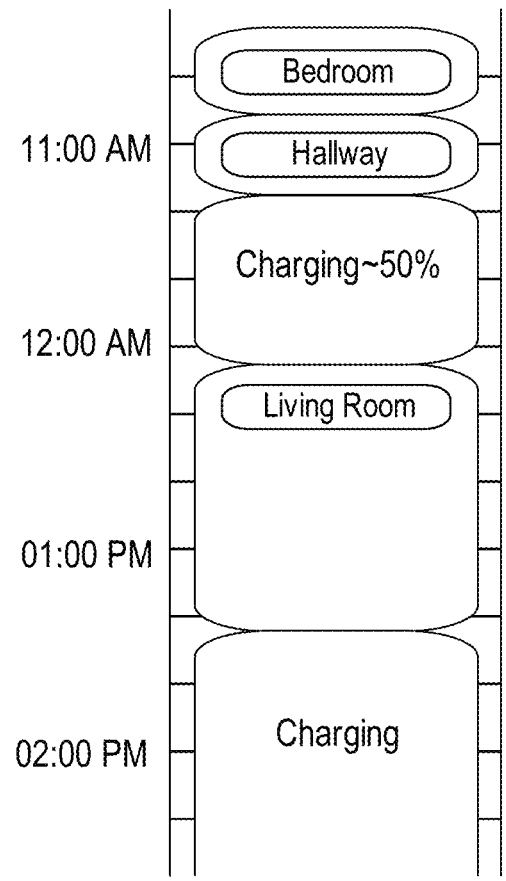

If there are not enough remaining resources available, for example, of the energy remaining in a battery, to completely finish a subtask, a replenishment of the resources can be included into the work plan. FIG. 7B, for example, shows an example of a work plan into which the charging of the battery has been included. Replenishing the resources can also entail emptying the collector bin (increasing its intake capacity) or refilling a cleaning agent.

It may be, for example, that around 25% of the battery capacity is needed to clean each of the subareas Bedroom R10 and Hallway R20 and around 80% of the battery capacity is needed to clean the subarea Living Room R30. Thus, after cleaning the subarea Bedroom R10, around 75% of the battery capacity is left. This is enough to clean the subarea Hallway R20. After cleaning the subarea Hallway R20 then, in accordance with this example, 50% of the battery capacity is still available. This, however, does not suffice for a complete cleaning of the subarea Living Room R30. Accordingly, a battery recharge can be included into the work plan between two subtasks.

The time needed to recharge the battery can be estimated based on the charging characteristics of the battery, the chosen charging program (in particular, the charging current and the charging voltage) and the amount of energy that the battery is to be charged with. After completing the charging of the battery, the next pending subtask (e.g. the cleaning of the subarea Living Room R30) can be included into the work plan.

If, after generating a work plan, the user makes changes to it that also change the resource consumption (e.g. vacuuming strength, number of repeated runs), it may become necessary to compile a new work plan. If the user increases the vacuuming strength, for example, energy consumption will increase and, correspondingly, more frequent or longer charging breaks will have to be included into the work plan. If the user increases the number of cleaning runs carried out on a surface during a general cleaning (so that, e.g. every point on the floor is cleaned at least twice, instead of only once), the time required for the cleaning will increase resulting in a corresponding increase in energy consumption. Here, too, longer and more frequent charging times will have to be accordingly included into the work plan, as well as longer processing times.

Some resources such as, for example, the intake capacity of a collector bin or a cleaning agent, can be replenished by the user and require a user intervention. In respect of this it is possible to test whether it may be assumed that enough resources are still available to successfully complete a planned subtask. If this is not the case, the user can be accordingly informed, for example, by sending a message via the HMI 200.

Figure 7C:
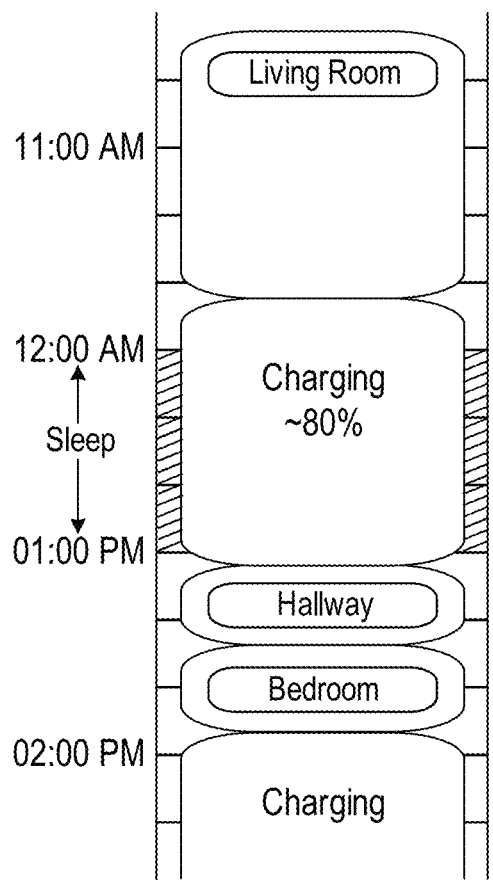

FIG. 7C shows a further example of an automatically generated work plan. In this case, however, the user has made a stipulation regarding the way the robot is to operate. This stipulation, for example, requires the robot to remain in a sleep mode during a specified time interval (12 to 1 pm). This means that no work tasks may be carried out at this time. In FIG. 7C this interval is shaded in. When planning the work in FIG. 7C, for example, the same work plan that is shown in FIG. 7B can be used (the robot begins the task in subarea Bedroom R10, after which follows the task in subarea Hallway R20), albeit with the alteration that the task in subarea Living Room R30 does not begin until 1 pm. In this case, between the cleaning of the subarea Hallway R20 and the cleaning of subarea Living Room R30, the robot would have a lot of time during which no subtask is carried out. Thus, a great deal of time would elapse before the entire work assignment is completed.

For example, by varying the sequence in which the subtasks are completed, together with their respective charging breaks, it is possible to determine that, when the subtask in the subarea Living Room R30 is carried out, its respective charging break will extend considerably into the time interval designated by the user as a sleep mode. In this manner the time spent in sleep mode can be "productively" used to replenish the resources of the robot. Thus, altering the sequence of the subtasks allows for the user's entire work assignment ("Clean the apartment") to be completed earlier. This improves the efficiency of the system and results in greater use satisfaction.

Figure 7D:
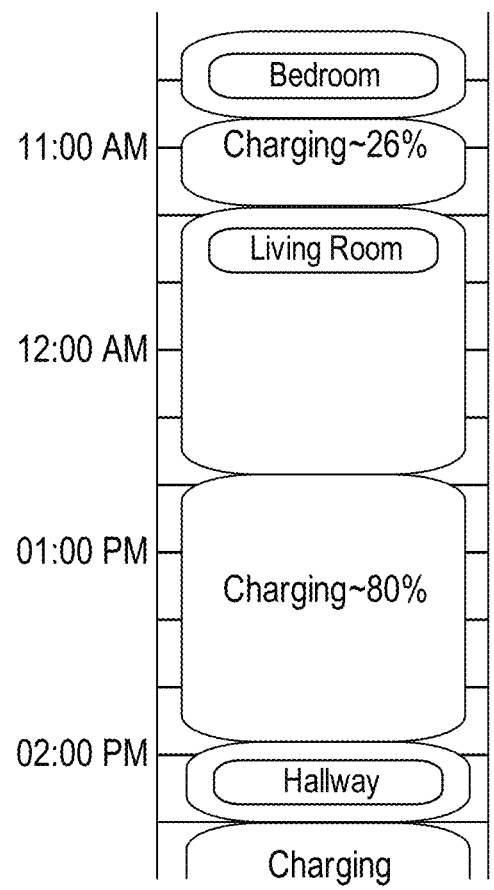

FIG. 7D shows a further example of a possible work plan. The user may want, for example, the subarea Bedroom R10 to be the first area cleaned and the subarea Living Room R30 to be cleaned afterwards. Accordingly, the last subarea in the work plan will be Hallway R20. After cleaning the subarea Bedroom R10, the 80% of the battery capacity that is needed to clean the subarea Living Room R30 will no longer be available. Therefore, a charging break is included into the work plan for after the completion of the first subtask. After cleaning the subarea Living Room R30, the 25% of the battery capacity that is needed to clean the subarea Hallway R20 is again not available. Therefore, another break for charging the battery is included into the work plan for after completing the second subtask. A fully charged battery, however, is not needed to complete the cleaning of the subarea Hallway R20, meaning that the procedure illustrated in FIG. 7D is inefficient and consumes too much time. For this reason, the robot can possess, for example, two or more different charging programs and the suitable charging program can be selected in dependency on the work plan. For example, a standard charging program can entail the complete charging of the battery. By using a rapid charge program, for example, the battery can be incompletely (partially) charged. In this case the battery, for example, will not be 100% charged. Loading the battery with less energy saves time. In addition to this, when the battery is around half full it generally takes less time to charge it. This allows, for example, the use of a comparatively strong charging current. It should, however, be noted that this will have a negative impact on the life expectancy of the battery.

Figure 7E:
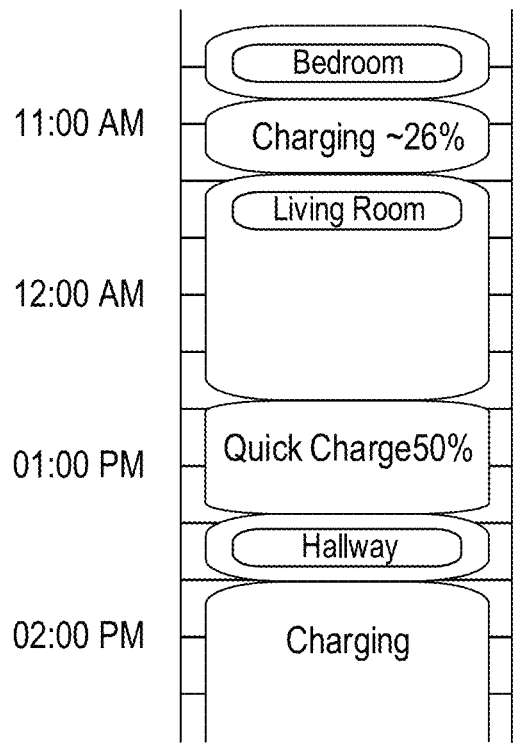

The charging mode can be selected, for example, based on the estimated amount of energy needed to complete the remaining or subsequent subtasks. FIG. 7E, for example, shows a work plan for which a quick charge program is selected for after cleaning the subarea Living Room R30. In this case, for example, it is only necessary to charge the battery by 50%. Alternatively or additionally, it is possible to determine the amount of energy that will be required to carry out the subsequent or still pending tasks. In this way the battery can be charged to a level that includes the needed amount of energy plus a safety buffer. If, for example, a battery capacity of 25% is needed to clean the subarea Hallway R20, the battery can be charged, for example, with by additional 50%, bringing the charge level of the battery up to a total of around 70%. The battery will then not be fully charged but the available 70% of the battery capacity will provide a sufficient buffer on top of the 25% that is estimated to be needed for the subtask. In this way, charging the battery with more energy than is needed to complete the subtask can be avoided, thereby reducing the time needed to charge the battery and allowing for a swifter completion of all of the subtasks.

Additionally or alternatively, the robot can possess a charging program that is particularly easy on the battery. This can be selected, for example, depending on the activity mode (robot mode) of the robot. For example, it can be selected while the robot is in sleep mode. When such a gentle charging program is selected, for example, the battery will be charged very slowly. The battery can also be charged to a level, for example, that is best suited for storage. After this the battery can be charged in suitable intervals to maintain this level. It is also possible to determine when the sleep mode is scheduled to end and to ensure that the battery is completely charged and the robot is completely ready to be operated by the end of the sleep mode. This will prolong the life expectancy of the battery and compensate for the negative impact produced by the quick charge mode.

Additionally or alternatively, further information can be taken into consideration when selecting the charging program. This may include, for example, the expected or current price of electricity. It may be determined, e.g. based on the work plan, that the robot is not expected to be deployed during a given time interval. Based on the expected development of the price for electricity, it is possible to determine when it would be the least expensive to charge the battery and the charging can be carried out at this time. Some electricity providers, for example, supply electricity a varying prices depending on the time of day. Alternatively or additionally, the user may possess their own energy source, such as a solar energy device, which may be less expensive to use at certain times.

Whenever possible, the autonomous mobile robot can carry out the work assignments it is given independently (with no or little intervention on the part of the user). At the same time, the robot should generally not disturb the user when carrying out its activities. This creates the problem that the robot does not a priori "know" when carrying out a task will be helpful or disturbing. A cleaning robot that cleans a bedroom, for example, will only be useful, that is, not present a disturbance, if it cleans the bedroom when the user is not sleeping. A security robot that carries out patrols to look for potential dangers such as burglars or stoves that have been left on, for example, will only be useful, that is, not present a disturbance, if it carries out its work assignment when the user or another person is not cooking a meal.

As previously mentioned, stipulations can be included into the work plan such as, for example, the times at which the robot should or is allowed to carry out a task. Planning can be simplified by including such stipulations regarding these times into the work plan as general rules. Thus, certain activity modes stipulating a specific behavior of the robot can be specified for certain time intervals, as is exemplarily shown in FIG. 5. For example, the work mode can be coupled to a specific time interval during which the robot can autonomously carry out its work. All automatically generated subtasks of the robot should then be included into the work plan and carried out during this interval. This may be a time, for example, when all of the users are out of the home.

A further time interval can be specified, for example, during which the robot is to be in a standby mode. During this time, for example, the robot should not independently begin or plan any tasks because the users are present. Nevertheless, the robot should be ready to carry out a task at any time when requested by a user to do so. This means, for example, that the battery should be charged as fully as possible and any collector bin present should be empty.

Another timer interval can be stipulated, for example, during which the robot will presumably not carry out any activity and, in particular, will not autonomously start or plan a task and during which it will be in a sleep mode. The battery of the robot, for example, need not be fully charged at this time. Instead a charging program can be selected that is optimally suited for prolonging the life expectancy of the battery. The robot can be switched into a mode that is particularly energy-saving and in which it will need a certain amount of time (e.g. for charging and running up certain software modules) to become fully deployable.

The set activity modes can pertain to one or more autonomous mobile robots. Different robots may also interpret one and the same activity mode (robot mode), for example, in different ways. For example, a security robot can enter a sleep phase during the ready mode. During the work mode it would move around patrolling and inform a security service and/or a user via a mobile device of any suspicious circumstances (break-in, fire). The security robot would also go on patrol during the sleep mode. It would, however, then additionally sound an acoustic alarm to awaken and warn the user, e.g. in the event of an unusual circumstance (break-in, fire). For other service robots such as, for example, a telepresence robot or a transport robot, the ready mode may also include that the battery is charged after every deployment using a quick charge program. This allows the robot to be made available again for the user more quickly.

The user can assign permanent times to the various activity modes, for example. The user may regularly be away from home from 9 am to 6 pm, for example, and may want the robot to carry out its tasks during this time. Accordingly, the user would activate the work mode, for example, for this period. From 6 to 12 pm, for example, the user may be at home and will not want to be disturbed by the robot. Nevertheless, it may be that the robot is needed, for example, to clean around the dining table after a meal, if necessary, and so the ready mode will be selected for the robot. From midnight until 9 am all of the users are asleep, for example and, as there is no need for the robot, it can be put into the sleep mode.

Alternatively or additionally, the time stipulations can be selected individually for different days of the week. On weekends the times spent in work mode can be reduced, for example, and postponed to a later time (e.g. 11 am) so that the user can sleep in. The work mode can also be completely deactivated on weekends, for example, and the robot will instead remain in ready mode. When a robot is deployed in an office, for example, the sleep mode can be activated on weekends, the ready mode during working times and the active mode at night. Alternatively or additionally, the time stipulations can be selected by the user to be active only once for the chosen period of time. For example, the user may leave on vacation and not need the robot during this period. In this case the user can put the robot into the sleep mode for the duration of the vacation (e.g. two weeks). If the robot possesses a gentle charging program, its battery can be charged and stored during this vacation period in a particularly gentle manner. This reduces the energy consumption of the robot to a minimum and prolongs the life expectancy of the battery.

Alternatively or additionally, the activity modes can be connected to other events such as the actions of the user or of other devices. Events involving actions of the user, for example, can be detected directly by the robot or with the aid of other devices and sensors of a smart home system. For example, with the aid of a so-called sleeping tracker it can be determined when the user is asleep and when they awaken. A corresponding message can be sent to the robot upon which, for example, it can switch from the sleep mode to the ready mode. Methods are also known that can be used to detect when a user leaves or enters the home. This event, for example, can trigger a change from the ready mode to the work mode (or the other way around).

Given such a high degree of flexibility, it may happen that a planned activity can no longer be (completely) finished because, for example, the user comes home early. When the user arrives, for example, the robot may be cleaning the living room. A change of the robot's mode from work mode to ready mode may be coupled to the user's arrival home. Upon switching to the ready mode, for example, the robot can interrupt the cleaning and postpone it to a later point in time when the work mode will once again be active. For example, a short time later the user may once again leave the apartment, triggering the activation of the robot's work mode and enabling it to continue its task. Whether a task is continued or once again started from the beginning can depend on how long the task was interrupted. The task can be continued (completed activities will not be repeated), for example, if the robot resumes the task on the same day. If the task is postponed until the following day, for example, it can be started once again from the beginning (completed activities will also be repeated). When doing so it is also possible to check whether the task (in particular the cleaning) is already planned for this day anyway, in which case only the task already planned for the day can be carried out, for example, and the postponed task can be cancelled, for example, without being entirely completed. As an alternative, the postponed task can also be carried out and the task that was planned for a later time can be omitted. Alternatively or additionally, the task can be carried out with greater intensity (e.g. vacuuming strength).

Flexible activity modes are also of an advantage in security robots, allowing the monitoring task to be specifically coupled to the activity and/or presence of the user. It can thus be ensured that the security robot will only carry out patrols when the user is not at home and a constrained and inflexible programming of permanent work times can be avoided.

A further example of where flexible activity modes can be applied is a robot for personal assistance in the household.

The robot may be configured, for example, to bring to the bed of a care-dependent person breakfast that someone else has prepared. Additionally or alternatively, the robot can also carry out some of the preparations autonomously, such as making coffee using a fully automatic coffee machine. A sleep tracker can be used to detect when the person in need of care awakes. This causes the activity mode of the assistance robot to switch to work mode. The first task planned for the work mode is the task "Bring breakfast". This task is thus automatically activated when the person awakes, omitting the need for a separate, time-consuming programming.

Here it should be pointed out that different stipulations governing the activity mode can be selected for each robot or the same stipulations can be selected for different robots. The activity mode stipulations can also be made for all of the maps (e.g. for every floor of a multistory house), for only one map (e.g. that of a single floor) and/or for individual subareas. Thus a stipulation can be selected that stipulates, for example, that the sleep mode is to be activated on the floor on which the bedroom is located at night (from midnight until 9 am). During this time period the work mode can be active on the other floors of the house. As a further example, the sleep mode can be set to only pertain to the bedroom.

Figure 8:
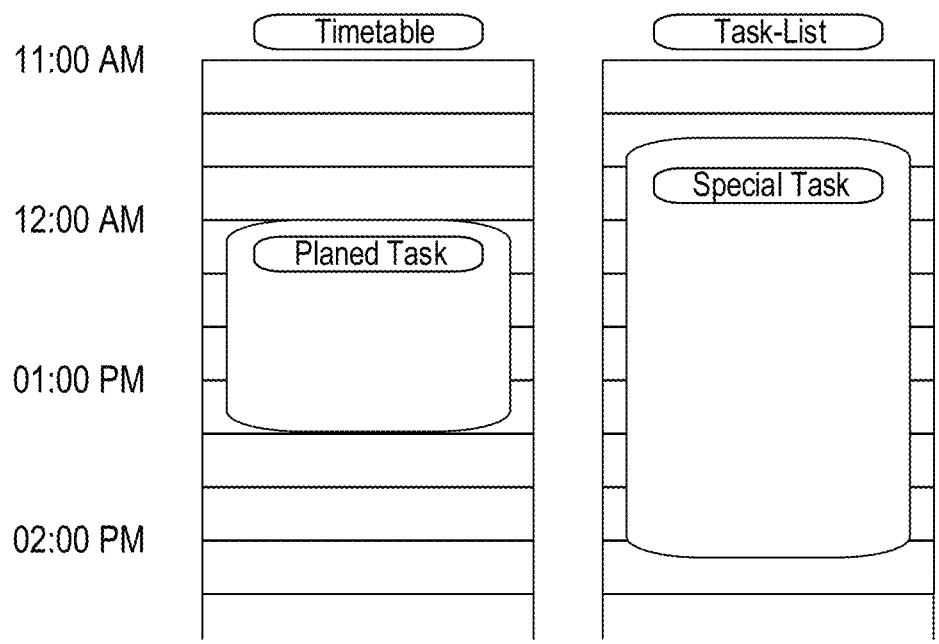
FIG. 8 shows an example of a temporal overlapping of subtasks.

When in daily use, a robot will generally receive from a user or from an external device unplanned work assignments that are to be carried out immediately and autonomously in addition to the work assignments that the robot is to regularly carry out and which are correspondingly entered in the time table. The robot can receive such a work assignment, for example, and carry it out with high priority. As shown in FIG. 8, an unplanned work assignment (special work assignment) may conflict with a planned work assignment, resulting in various problems. For example, it may be that the planned work assignment is started according to schedule (e.g. at 12 am) and that the special work assignment is interrupted. This, however, may result in behavior that potentially does not coincide with the user's wishes if, for example, the special work assignment was given with a particular intention in mind on the part of the user. Therefore, as an alternative, it is also possible to ignore all planned work assignments while carrying out the special assignment. This, on the other hand, could also result in undesired behavior if, for example, the user is counting on a planned work assignment being carried out.

In order to avoid these problems, it is possible to check whether the special work assignment received by the robot conflicts time-wise with a planned work assignment. If such a conflict exists, a decision can be made as to whether, and if so when, the planned work assignment should be carried out. For example, the planned work assignment can be carried out after completion of the special work assignment, meaning that the planned work assignment is postponed to a later time. When postponing a planned work assignment, the general planning stipulations entered into the time table and, in particular, the activity modes can be taken into consideration, as exemplarily described further above. For example, the planned work assignment cannot be postponed to be carried out during the sleep mode. The planned work assignment can only be postponed, for example, to be carried out during the work mode. This means that, if there is no time or not enough time available in the work mode to complete the planned work assignment after finishing the special work assignment, then the latter is postponed until the next available time in which the work mode will be active. In particular, the planned work assignment can be postponed in such cases to the following day.

There are also work assignments, for example, that have to be carried out daily. In some cases it may not be desirable for such a planned work assignment that is normally carried out every day to be postponed until the following day and to consequently carry out the work assignment twice on that day. In these cases the planned work assignment can be cancelled due to the special work assignment. Additionally, for example, the planned work assignment that was cancelled on one day can be carried out with particular intensity on the following day (e.g. with greater vacuuming strength). It may also be that the special work assignment encompasses, at least partially, the planned work assignment. In this case, that part of the planned work assignment that is included in the special work assignment can be omitted. The division of work assignments into subtasks described further above can facilitate the analysis of whether a first work assignment encompasses a second work assignment at least partially. This is illustrated in the following two examples.

For example, it may have been planned to clean the subarea Hallway R20 when the user instructs the robot to "Clean the apartment", a work assignment that, as described above, is broken down into the subtasks of cleaning the subareas Bedroom R10, Hallway R20 and Living Room R30. Thus it can be determined that the subtask of cleaning the subarea Hallway R20 that is consequently generated corresponds to the planned work assignment.

In an analogous example it may be planned to clean the entire apartment, whereas this work assignment is broken down into the subtasks of cleaning the subareas Bedroom R10, Hallway R20 and Living Room R30. The user may now instruct the robot to clean the subarea Living Room R30, for example. First it is checked whether the received special work assignment received ("Clean living room") conflicts with the time of the planned work assignment ("Clean apartment"). In the process it may be determined, for example, that the planned assignment of cleaning the apartment, including the cleaning of the subareas Bedroom R10 and Hallway R20, would (normally) begin at the time at which the cleaning of the subarea Living Room R30 is carried out. Even if the planned subtask that entails cleaning the subarea Living Room R30 does not conflict time-wise with the special work assignment "Clean Living Room", this part of the planned work assignment can be omitted in this case. This means that, in accordance with the user's instructions, first the subarea Living Room R30 is cleaned, after which the remaining parts of the planned work assignment—the subtasks of cleaning the subareas Bedroom R10 and Hallway R20—will be completed (if needed after a break for charging the battery).

The autonomous mobile robots that are currently employed in households are not usually capable of operating completely without help from a user. For example, the user must empty dirt containers, must regularly clean sensors, brushes and other components of the robot and/or must manually carry the robot to a different floor of a house. It may be useful to remind the user of these tasks in order to help ensure that the robot can operate autonomously and without malfunctions. For example, reminders can be sent to the user in regular intervals. This might, however, result in reminders being sent to the user when there is actually no need to do so, which the user will find disturbing. In order to prevent this from happening, the robot can be equipped with sensors, for example, that detect the necessity of a user intervention. Using these it is possible to determine, for example, when the collector bin is full and the robot can then send a corresponding message to the user. It may also happen, however, that this message reaches the user at an inconvenient time (in particular, when the user is not at home) and that it will not be possible to immediately empty the collector bin. A message sent at a later point in time, however, might be forgotten by the user and the reminder would then be useless.

In order to ensure that a reminder really is of service to the user, it can be sent, for example, at a suitable time and only when necessary. The times that are suitable for sending a reminder can be entered into an electronic time table. One such time, for example, might be in the morning before the user leaves the house or in the evening before the user goes to bed. It is possible to check at these times whether a reminder is currently needed. One or more prerequisites can be checked for this and, if any are found to be given, a reminder can be sent to the user.

It is possible to check, for example, whether a collector bin is full or whether a cleaning agent needs to be refilled. This can also include a collector bin or a cleaning agent container of a base station, for example, into which the robot autonomously disposes of dirt, or respectively, out of which it refills a cleaning agent. It can also be checked whether the available resources will presumably suffice to fulfill a planned task. A reminder can be sent to the user, for example, indicating that the collector bin is not yet full but that its capacity for taking in collected dirt will presumably be exhausted after half of the task is completed. In order to determine this, for example, the empirical values regarding the amount of dirt collected during the previous work deployments can be used (e.g. the average amount of dirt collected over the previous ten deployments). This approach can be applied to all measurable resources of the robot.

For example, it is possible to check when the user last serviced the robot, in particular, when the sensors and actuators (wheels, brushes, etc.) were cleaned for the last time. If this time exceeds a specifiable value and/or the robot has been in operation since it was last serviced longer than a specifiable period of time, a reminder can be sent to the user.

There may be certain conditions that can only be verified when the robot is in close proximity. For example, the robot may have been given the planned task of cleaning a certain room (subarea), to which the user has to open a door open before leaving the apartment. In this case the robot can go to the room and check whether the door has been opened shortly before the user leaves the apartment as scheduled. If the door is found to be closed, a reminder is sent. This avoids the necessity of the robot sending a standard reminder to the user every morning that the door should be opened regardless of whether the door is actually open or whether the reminder is needed.

In a further example, the robot is supposed to carry out, according to schedule, a planned task on a floor of the house that it can only get to when carried there by a user. In this case, shortly before the user leaves the apartment as scheduled, the robot can check whether it is on the correct floor. For this a self-localization may be needed. In order to carry out a self-localization, the robot may have to move within the deployment area. If the robot determines that it is not located in the correct deployment area (on the correct floor), a reminder can be sent to the user.

In addition to sending a reminder, the robot can move to a specified location. When, for example, the collector bin should be emptied, the robot can move to a location near the trash can, making emptying the collector bin somewhat easier for the user. If, for example, it had been necessary to carry the robot to a different floor, the robot can move to a location near the staircase, shortening the distance for the user.

For example, it is possible to check whether the user is at home. This ensures that the user will be able to react to the reminder. The check can be conducted by means of smart home devices, for example, such as door locks that register when the user leaves the apartment. Alternatively or additionally, it is possible to check whether a mobile device that the user usually has with him/her (e.g. smart phone, smart watch or other "wearables") is logged in to a local network (WLAN). Alternatively or additionally, the user can be configured to recognize the user, for example, using images recorded by a camera. The robot can then move around and check whether it finds the user. The robot can also move about and try to locate the user with the aid of motion sensors, without previously performing a localization based on camera images. If the user is present, a reminder can be sent to the user. In particular, once the robot has found the user, the reminder can come in the form of an acoustic signal, for example, a personalized salutation. If it is determined that the user is not at home, the reminder can be postponed to a later point in time. In particular, the reminder can be dispatched at a later point in time when the user is found, for example, when the user arrives home.

Already during the planning of some tasks it becomes apparent that their completion will require a preceding user intervention in the form of opening a door or of moving the robot to a different floor. For example, it is possible to check during the task planning whether a user intervention might be required. If this is the case, a suggestion can be made to the user to include a reminder into the work plan. A time for the reminder can also be proposed, which should lie before the planned starting time of the task. Reminders can be included into the work plan automatically, as well. As they are only sent when needed, this does not result in any unnecessary disturbance to the user. When attempting to complete a scheduled planned task, for example, the robot may determine that it cannot be completed without an intervention on the part of the user. Accordingly, a suggestion is made to the user to include a reminder into the work plan and a time for the reminder is also proposed, or the reminder can be automatically included into the work plan.

In a further example, it is possible to determine whether a reminder was successful, in particular, based on whether a user intervention was actually carried out following a reminder. This means, for example, that a collector bin has been emptied, a door has been opened, or the robot has been repositioned or serviced. If a reminder does not result in a user intervention, this may be due to the reminder having taken place at an unsuitable time. If this is the case, it can be suggested to the user to reschedule the reminder or an additional reminder can be proposed for inclusion into the work plan. In particular, a new time point for the reminder can be proposed. As an alternative, it is also possible for the robot to automatically change (reschedule) the time point of the reminder or include an additional reminder into the work plan.

In the course of using an autonomous mobile robot 100 daily it may be determined, for example, that a given division of the environment into subareas is impractical in daily use. This is often the case when a task cannot be completed as stipulated. This may regard, for example, stipulations chosen by the user such as, for example, a stipulation of the user that a given task is to be completed by a specified time. Further examples include stipulations that result from the limitations of the robot's resources such as, for example, when there is not enough energy remaining in the robot's battery for it to fully complete a subtask. In such a case, for example, the robot could return to the base station and charge its battery while carrying out the subtask, but this would make the robot's behavior altogether less predictable and thus less plannable.

There may be various reasons why a similar task cannot be completed. For example, after completing an exploratory run the robot may make a prediction regarding the cleaning time and/or energy consumption that turns out to be invalid in practice. Before the exploratory run, the user might have cleared away obstacles such as chairs, for example, that do have to be detected and circumvented when the robot is deployed daily. This will increase both the deployment duration and the energy consumption and as a result, for example, the charging capacity of the battery used in the deployment will not suffice to complete the task having only charged the battery once. The capacity of the battery employed in the robot may also decline as the battery ages, for example, and it will no longer be able to store enough energy to complete the task with only one battery charge. It can happen, for example, that the user selects a different parameter for carrying out the task such as, e.g. a higher cleaning intensity, e.g. an increased vacuuming strength. This may increase the duration of the deployment and/or the amount of energy needed to such a degree that it is no longer possible to complete the task or to complete the task safely.

In order for the robot to generate new subtasks that can be completed in accordance with the stipulations, a suggestion can be made to the user to carry out a new division. Alternatively or additionally, a user may also determine, for example, that a subtask takes up too much time and can request that a subtask be divided by generating a new division of the underlying deployment area into subareas in which, for example, every subtask can be completed within a specified period of time (e.g. 30 Min.).

In the example illustrated in FIG. 4, the subarea Living Room R30 is very large and requires corresponding amounts of time and energy to clean. If the settings for vacuuming strength (power) or for the frequency with which a particular site is cleaned (coverage) are changed, the cleaning may take a long time to complete and/or the battery will not provide enough energy.

In the simplest case, in order to create a new division, the existing subarea that cannot be processed as stipulated is divided into two or more subareas. For this purpose the known methods for dividing the deployment area of a robot are used, for example. It is then possible to test whether the subtasks corresponding to the newly generated subareas can be completed in accordance with the stipulations.

Additionally or alternatively, the resource consumption for the subarea can be analyzed. It may be determined, for example, that in a region of the subarea Living Room R30 in which a table with chairs is located (cf. FIG. 4), the robot needs a great deal of time to maneuver around the table and chair legs. Accordingly, this region can be separated from the rest of the subarea Living Room R30 and made into a new subarea. Thus the area Living Room R30 can be divided into a first subarea Living Room R31 and into a second subarea Living Room R32.

In order to determine where the robot needs a heightened amount of time, a raster with (e.g. square) cells of a specified size (e.g. that of the robot's diameter—30 cm) can be placed onto the subarea. It can then be determined how much time the middle point of the robot spends in each cell while carrying out a cleaning (especially the last one). In an analogous manner, the consumption of other resources, in particular that of energy, in connection with the robot's location can also be determined. Here is should be pointed out that the energy consumed during cleaning depends, in particular, on the kind of floor covering present.

When a new division is generated it may also be determined that the size of the previously existing subarea that was not able to be processed in accordance with the stipulations can be reduced. For this purpose, for example, a segment of the subarea can be added to an adjacent subarea.

The user can alter the division of the robot's deployment area into the various subareas at any time. For example, the user can adapt the room division such as the one exemplarily illustrated in FIG. 4. For example, the user can further divide any of the shown subareas into two or more smaller subareas, can join two or more subareas together into a larger subarea or can shift the borders of the subareas. Alternatively or additionally, the user can create, revise and/or delete user-defined subareas. Such user-defined subareas can be regions that the robot is not allowed to enter, for example (exclusion regions), or those that the user wants to have regularly or occasionally cleaned.

Altering a subarea may also cause a change to the way in which the respective connected tasks are carried out. In particular, the subtasks that are based on the subareas and their respective work plan may be changed. Accordingly, the work plan, in particular that of the effected (sub-) areas can be adapted. The adapted work plan can be automatically saved or it can be displayed to the user for confirmation or correction before being saved.

The shape and size of a subarea, for example, can be altered by shifting the borders of the subarea. This will also result in a change in the resource consumption (e.g. time, energy) needed for a (sub-)task that is to be carried out in the subarea in question. Accordingly, the resource consumption must be newly determined in order to update a work plan saved in a time table with the newly determined resource consumption. Shifting the border of a subarea often affects one or more neighboring subareas, as a result of which the total consumption of resources may remain relatively constant and the changes made to the work plan can be limited to an update of the work duration and the corresponding starting times.

For example, deleting a (user-defined) subarea may result in a planned (sub-)task that is to be carried out in this subarea also being deleted from the time table. This then may make more resources (e.g. battery capacity) available for subsequent tasks or may enable them to be started earlier. Accordingly, the starting times and the planned battery charging times of the subsequent tasks are also updated.

A large subarea, for example, can be broken down into two or more smaller subareas. A task based on the large subarea can be broken down into subtasks based on the newly generated smaller subareas in accordance with the previously described procedure (see above). The subtasks can be planned for the same time period that was previously occupied by the task corresponding to the large subarea before it was broken down. It is also possible to generate a new work plan that takes into consideration the previously and subsequently planned subtasks. This can help to optimize the consumption of resources, for example, and allow all of the subtasks to be completed more quickly.

Two or more smaller subareas can be combined into a larger subarea. A prerequisite for this that can be checked is whether the smaller subareas are adjacent to each other and have a connection that the robot can directly move through. The planned (sub-)tasks that are based on the smaller subareas may have been planned to be carried out in sequence, in which case they can be directly replaced by the task for the new larger subarea.

The planned (sub-)tasks that are based on the smaller subareas can be included into the work plan at different times. In this case an entirely new work plan based on the new, larger subarea can be generated. Using one very simple exemplary solution, the planned (sub-) tasks that are based on the smaller subareas can be deleted and the time slots that thereby become available can be used to refill resources, in particular to charge the battery. In this case the new task that is based on the new, larger subarea can be scheduled, for example, in the next available time slot of sufficient length. When doing so, the specified work modes for the robot can be taken into consideration.

A further possible user intervention into the work plan that concerns the division of the deployment area is, for example, the designation and deletion of exclusion regions that the robot is not allowed to enter autonomously. For example, a subarea such as a room can be entirely marked as an exclusion region. If a (sub-)task is planned for this subarea, it can be deleted, for example. Subsequently planned tasks can be moved, for example, to the time slot that has thereby become available. Alternatively, the planned (sub-)task can be kept in the work plan but not carried out until the user has reopened the exclusion region. The available time can be utilized by the robot, for example, to refill its resources (charge the battery) or to carry out a quick cleaning of other areas.

Additionally or alternatively, the user can generate user-defined subareas and designate them as exclusion regions that the robot is not allowed to enter autonomously. These exclusion regions may overlap with one or more subarea for which (sub-)tasks are planned. If the exclusion regions are large enough, they may influence the performance of a (sub-)task in the subarea. In particular, a newly created exclusion region will reduce the amount of resources such as time and energy that are needed to complete the task. On the other hand, deleting an exclusion region may increase the amount of resources such as time and energy that are available to complete the task. For this reason it is possible to check whether a user-defined exclusion region overlaps with one or more subareas. It can be further checked, for example, whether the overlap exceeds a specifiable area (e.g. 1 sq. m.). If this is the case, the resource consumption for carrying out a (sub-)task in the subarea can be newly determined and the planned tasks can be correspondingly adapted.

The methods described here can be implemented in the form of software. The software can be executed on a robot, a HMI and/or on any other computer such as, for example, a home server or a cloud server. In particular, individual parts of the method can be divided into different software modules that are executed on different devices.

The invention claimed is:

1. A method for controlling at least one autonomous mobile robot, wherein the at least one robot is configured to navigate in a deployment area using a map of this the deployment area and to autonomously carry out at least one task in this the deployment area, the method comprising:
receiving a work assignment, wherein the work assignment contains instructions for carrying out at least one task in the deployment area and wherein at least one resource is needed to carry out the work assignment;
automatically dividing the work assignment into at least two subtasks;
automatically determining a sequence in which the subtasks are to be completed by the at least one robot, wherein after completing all of the subtasks, the work assignment is completely finished; and
checking, before beginning a subtask, whether there are enough resources available to completely finish another different subtask; and if there are enough resources available to completely finish the other different subtask, altering the automatically determined sequence of the subtasks and carrying out the other different subtask using the available resources.

2. The method in accordance with claim 1, wherein the dividing of the work assignment into at least two subtasks is carried out based on at least one of the following:
a structure of the environment;
the number of robots available;
the number of tasks to be carried out; or
the kind of tasks to be carried out.

3. The method in accordance with claim 1, wherein dividing the work assignment into at least two subtasks comprises dividing the at least one task into at least two tasks; and
every subtask comprises carrying out one of the at least two tasks in the entire deployment area or in a part of the deployment area.

4. The method in accordance with claim 1, wherein the deployment area is divided into at least two subareas; and
dividing the work assignment into at least two subtasks entails that every subtask comprises carrying out at least one task in one of the subareas.

5. The method in accordance with claim 4, wherein the deployment area is an apartment or a house and each of the subareas comprises a room or at least a region of a room in the apartment or house.

6. The method in accordance with claim 1, wherein the method further comprises at least one of the following steps:
determining a presumed consumption of the resources that are needed to carry out each of the subtasks;
determining the amount of available resources before carrying out a subtask;
determining the amount of available resources after carrying out a subtask; or
replenishing the one or more resource if the amount of resource(s) available before beginning a subtask do(es) not suffice to carry out the subtask.

7. The method in accordance with claim 6, wherein the at least one resource comprises at least one of the following:
energy;
time; or
cleaning agent.

8. The method in accordance with claim 6, wherein determining a presumed resource consumption that is needed to carry out each of the subtasks is carried out taking into consideration a resource consumption determined for preceding identical or similar subtasks under identical or similar conditions.

9. The method in accordance with claim 6, further comprising:
comparing the resource consumption needed to carry out each of the subtasks that is determined in advance of carrying out the subtask with the resource consumption that was actually needed to carry out each of the tasks.

10. The method in accordance with claim 1, further comprising:
receiving information regarding a desired starting time at which carrying out the work assignment should begin;
entering the subtasks in a determined sequence into a time table, wherein the starting time of the first subtask designated in the time table corresponds to the desired starting time of the work assignment; and automatically starting the work assignment at the desired time entered in the time table.

11. The method in accordance with claim 1, wherein at least one resource is needed to carry out the work assignment and wherein determining the sequence in which the subtasks are to be carried out further comprises:

determining at least one time between at least two subtasks at which at least one resource is to be at least partially replenished.

12. The method in accordance with claim 1, wherein the automatically determined sequence of the subtasks can be altered or adapted by a user, wherein the alteration or adaptation comprises altering or adapting the intended starting time of at least one subtask.

13. The method in accordance with claim 1, wherein determining the sequence in which the subtasks are to be carried out is carried out depending on at least one stipulation, wherein the automatically determined sequence of the subtasks can be altered or adapted by a user, and wherein the alteration or adaptation comprises altering or adapting the at least one stipulation.

14. The method in accordance with claim 13, wherein the at least one stipulation comprises at least one of the following:

various activity modes, wherein an activity mode stipulates whether the at least one robot should autonomously carry out tasks and/or should be available to the user for carrying out tasks that were not previously planned and/or should not carry out any task;

a vacuuming strength; or an intensity of the cleaning of the deployment area.

15. The method in accordance with claim 1, wherein at least two robots are available and each of the at least two robots carries out at least one of the subtasks.

16. The method in accordance with claim 1, further comprising determining whether a successful completion of a subtask can be expected; and sending a message to the user if it is determined that at least one subtask will not be successfully completed.

17. The method according to claim 16, wherein determining whether a successful completion of a subtask can be expected comprises at least one of the following:

determining whether a resource will have to be replenished while carrying out a subtask;

determining whether a collector bin will have to be emptied;

determining whether access must be given to a subarea; or determining whether the robot will have to be manually transported into another subarea.

18. The method in accordance with claim 1, wherein automatically determining a sequence in which the subtasks are to be carried out by the at least one robot is carried out taking into consideration planning stipulations entered in a time table.

19. The method in accordance with claim 18, wherein the planning stipulations comprise information regarding a desired activity of the at least one robot (100) at certain times.

20. A method for controlling at least one autonomous mobile robot, wherein the at least one robot is configured to navigate in a deployment area using a map of the deployment area and to autonomously carry out at least one task in this the deployment area, the method comprising:

receiving a work assignment, wherein the work assignment contains instructions for carrying out at least one task in the deployment area;

automatically dividing the work assignment into at least two subtasks;

automatically determining a sequence in which the subtasks are to be completed by the at least one robot, wherein after completing all of the subtasks, the work assignment is completely finished, determining an amount of time that is presumably needed to carry out a subtask, and wherein determining an amount of time that is presumably needed to carry out a subtask comprises taking into consideration a safety buffer and use it to determine the presumed time.

21. The method in accordance with claim 20, wherein the starting time of the following subtask is determined based on the presumed time.

22. A method for controlling at least one autonomous mobile robot, wherein the at least one robot is configured to navigate in a deployment area using a map of the deployment area and to autonomously carry out at least one task in this the deployment area;

the method comprising:

receiving a work assignment, wherein the work assignment contains instructions for carrying out at least one task in the deployment area;

automatically dividing the work assignment into at least two subtasks;

automatically determining a sequence in which the subtasks are to be completed by the at least one robot, wherein after completing all of the subtasks, the work assignment is completely finished, wherein automatically determining a sequence in which the subtasks are to be carried out by the at least one robot is carried out taking into consideration planning stipulations entered in a time table, wherein the planning stipulations comprise information regarding a desired activity of the at least one robot at certain times, wherein the planning stipulations comprise at least one activity mode and wherein the at least one activity mode comprises at least one of the following:

a work mode, wherein the robot is configured to autonomously plan and carry out the work assignments given for a corresponding time while the robot is in the work mode;

a ready mode, wherein the robot is configured to not autonomously plan or carry out any work assignments while the robot is in the ready mode and to only plan and carry out arising work assignments when instructed to do so by a user; or a sleep mode, wherein the robot is configured to not plan or carry out any work assignments while the robot is in the sleep mode.

23. The method in accordance with claim 22, wherein the robot is configured to replenish resources, if needed, while the robot is in the ready mode or the sleep mode.

24. An autonomous robot configured to navigate in a deployment area using a map of the deployment area and to autonomously carry out at least one task in the deployment area, wherein the autonomous robot is connected to an internal and/or an external data processing device which is configured to execute a software program that, when executed by the data processing device, causes the autonomous robot to:

receive a work assignment, wherein the work assignment contains instructions for carrying out at least one task in the deployment area and wherein at least one resource is needed to carry out the work assignment;

automatically divide the work assignment into at least two subtasks;

automatically determine a sequence in which the at least two subtasks are to be completed by the autonomous robot, wherein after completing all of the at least two subtasks, the work assignment is completely finished; and check, before beginning a first subtask, whether there are enough resources available to completely finish a second subtask, and if there are enough resources available to completely finish the other different subtask, alter the automatically determined sequence of the subtasks and carry out the other different subtask using the available resources.

25. An autonomous robot configured to navigate in a deployment area using a map of the deployment area and to autonomously carry out at least one task in the deployment area, wherein the autonomous robot is connected to an internal and/or an external data processing device which is configured to execute a software program that, when executed by the data processing device, causes the autonomous robot to:

receive a work assignment, wherein the work assignment contains instructions for carrying out the at least one task in the deployment area;

automatically divide the work assignment into at least two subtasks;

automatically determine a sequence in which the at least two subtasks are to be completed by the at autonomous robot, wherein after completing all of the at least two subtasks, the work assignment is completely finished, and determine an amount of time that is presumably needed to carry out a subtask, and wherein determining an amount of time that is presumably needed to carry out a subtask comprises taking into consideration a safety buffer and use it to determine the presumed time.

26. An autonomous robot configured to navigate in a deployment area using a map of the deployment area and to autonomously carry out at least one task in the deployment area, wherein the autonomous robot is connected to an internal and/or an external data processing device which is configured to execute a software program that, when executed by the data processing device, causes the autonomous robot to:

receive a work assignment, wherein the work assignment contains instructions for carrying out the at least one task in the deployment area;

automatically divide the work assignment into at least two subtasks;

automatically determine a sequence in which the at least two subtasks are to be completed by the autonomous robot, wherein after completing all of the at least two subtasks, the work assignment is completely finished, wherein automatically determine a sequence in which the at least two subtasks are to be carried out by the autonomous robot is carried out taking into consideration a planning stipulation entered in a time table, wherein the planning stipulation comprises information regarding a desired activity of the autonomous robot at certain times, wherein the planning stipulation comprises at least one activity mode and wherein the at least one activity mode comprises at least one of the following:

a work mode, wherein the autonomous robot is configured to autonomously plan and carry out the work assignments given for a corresponding time while the autonomous robot is in the work mode;

a ready mode, wherein the autonomous robot is configured to not autonomously plan or carry out any work assignments while the autonomous robot is in the ready mode and to only plan and carry out arising work assignments when instructed to do so by a user; or a sleep mode, wherein the autonomous robot is configured to not plan or carry out any work assignments while the autonomous robot is in the sleep mode.

27. A method for controlling at least one autonomous mobile robot, wherein the at least one robot is configured to navigate in a deployment area using a map of this the deployment area and to autonomously carry out at least one task in this the deployment area;

the method comprising:

receiving a work assignment, wherein the work assignment contains instructions for carrying out at least one task in the deployment area;

automatically dividing the work assignment into at least two subtasks;

automatically determining a sequence in the subtasks are to be completed by the at least one robot, wherein after completing all of the subtasks, the work assignment is completely finished, wherein the method further comprises determining an amount of time that is presumably needed to carry out a subtask, wherein the presumed starting time of a following subtask is adapted in accordance with an actual amount of time needed to carry out the preceding subtask that is determined for the preceding subtask so that the starting time of the following subtask corresponds to the ending time of the preceding subtask; or a following subtask is started after at least one special task.

28. The method in accordance with claim 27, wherein the at least one special task is started only if the amount of time between the actual ending time of the preceding subtask and the starting time of the following subtask exceeds a specified threshold.

29. The method in accordance with claim 28, wherein the at least one special task comprises at least one of the following:

replenishing at least one resource;

emptying a collecting bin;

cleaning one or more corners of a deployment area;

repeated or additional cleaning of heavily soiled regions in the deployment area, and carrying out a monitoring task.

30. An autonomous robot configured to navigate in a deployment area using a map of the deployment area and to autonomously carry out at least one task in the deployment area, wherein the robot is connected to an internal and/or external data processing device which is configured to execute a software program that, when executed by the data processing device, causes the robot to:

receive a work assignment, wherein the work assignment contains instructions for carrying out at least one task in the deployment area and wherein at least one resource is needed to carry out the work assignment;

automatically divide the work assignment into at least two subtasks;

automatically determine a sequence in the subtasks are to be completed by the at least one robot, wherein after completing all of the subtasks, the work assignment is completely finished, and determine an amount of time that is presumably needed to carry out a subtask, wherein the presumed starting time of a following subtask is adapted in accordance with an actual amount of time needed to carry out the preceding subtask that is determined for the preceding subtask so that the starting time of the following subtask corresponds to the ending time of the preceding subtask; or a following subtask is started after at least one special task.

* * * * *